US 7,108,284 B2

(12) United States Patent
Mori et al.

(10) Patent No.: US 7,108,284 B2
(45) Date of Patent: Sep. 19, 2006

(54) WEBBING RETRACTOR

(75) Inventors: Shinji Mori, Aichi-ken (JP); Fuminori Komiya, Aichi-ken (JP); Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 167 days.

(21) Appl. No.: 10/615,388

(22) Filed: Jul. 9, 2003

(65) Prior Publication Data
US 2004/0075008 A1    Apr. 22, 2004

(30) Foreign Application Priority Data
Jul. 11, 2002  (JP)  ............................. 2002-202970

(51) Int. Cl.
*B60R 22/46*  (2006.01)

(52) U.S. Cl. ................. 280/806; 242/374; 242/390.8

(58) Field of Classification Search ................ 180/268; 280/806, 807; 242/374, 394, 390.8, 390.9
See application file for complete search history.

(56) References Cited

U.S. PATENT DOCUMENTS

| 4,423,846 A |   | 1/1984 | Föhl |   |
|---|---|---|---|---|
| 4,637,630 A |   | 1/1987 | Nishimura et al. |   |
| 4,750,685 A |   | 6/1988 | Frei |   |
| 4,991,790 A |   | 2/1991 | Föhl et al. |   |
| 5,087,075 A | * | 2/1992 | Hamaue | 280/806 |
| 5,098,030 A |   | 3/1992 | Kosugi |   |
| 5,232,177 A | * | 8/1993 | Hibata | 242/382.2 |
| 5,529,258 A |   | 6/1996 | Dybro et al. |   |
| 5,730,384 A |   | 3/1998 | Fohl |   |
| 5,788,281 A | * | 8/1998 | Yanagi et al. | 280/806 |
| 5,918,717 A |   | 7/1999 | Fohl |   |
| 5,934,596 A | * | 8/1999 | Gorman et al. | 242/379.1 |
| 6,364,236 B1 |   | 4/2002 | Fohl |   |
| 2002/0005447 A1 |   | 1/2002 | Nagata et al. |   |
| 2003/0052209 A1 |   | 3/2003 | Honl et al. |   |
| 2004/0075008 A1 |   | 4/2004 | Mori et al. |   |
| 2004/0079828 A1 |   | 4/2004 | Mori et al. |   |

(Continued)

FOREIGN PATENT DOCUMENTS

DE    201 15 316 U1    3/2002

(Continued)

OTHER PUBLICATIONS

European Official Action dated Jan. 13, 2005 in corresponding European Patent Application No. EP 03 015 524.6.

*Primary Examiner*—David R. Dunn
(74) *Attorney, Agent, or Firm*—Thomas W. Cole; Nixon Peabody LLP

(57) ABSTRACT

A webbing retractor which, by causing relative rotation between a prime mover rotating body and a rotating disc, connects the prime mover rotating body and a driven shaft which is connected to a take-up shaft of a webbing belt. A planet gear is pivotally supported at a plate having a braking piece and meshes with a sun gear. The plate is supported so as to be swingable around the sun gear. When the sun gear is driven to rotate at greater than a predetermined speed, the planet gear begins to circle around the sun gear against urging force of a spring attached to the plate, and makes the plate rotate such that the braking piece slidingly contacts the friction ring. Due to this braking, the rotating disc connected to the friction ring rotates relative to the prime mover rotating body.

15 Claims, 15 Drawing Sheets

U.S. PATENT DOCUMENTS

2004/0108155 A1 6/2004 Mori et al.

FOREIGN PATENT DOCUMENTS

| | | |
|---|---|---|
| EP | 1 195 536 A1 | 4/2002 |
| GB | 2 354 742 A | 4/2001 |
| JP | 03-065455 | 3/1991 |
| JP | 2000-142321 | 5/2000 |

* cited by examiner

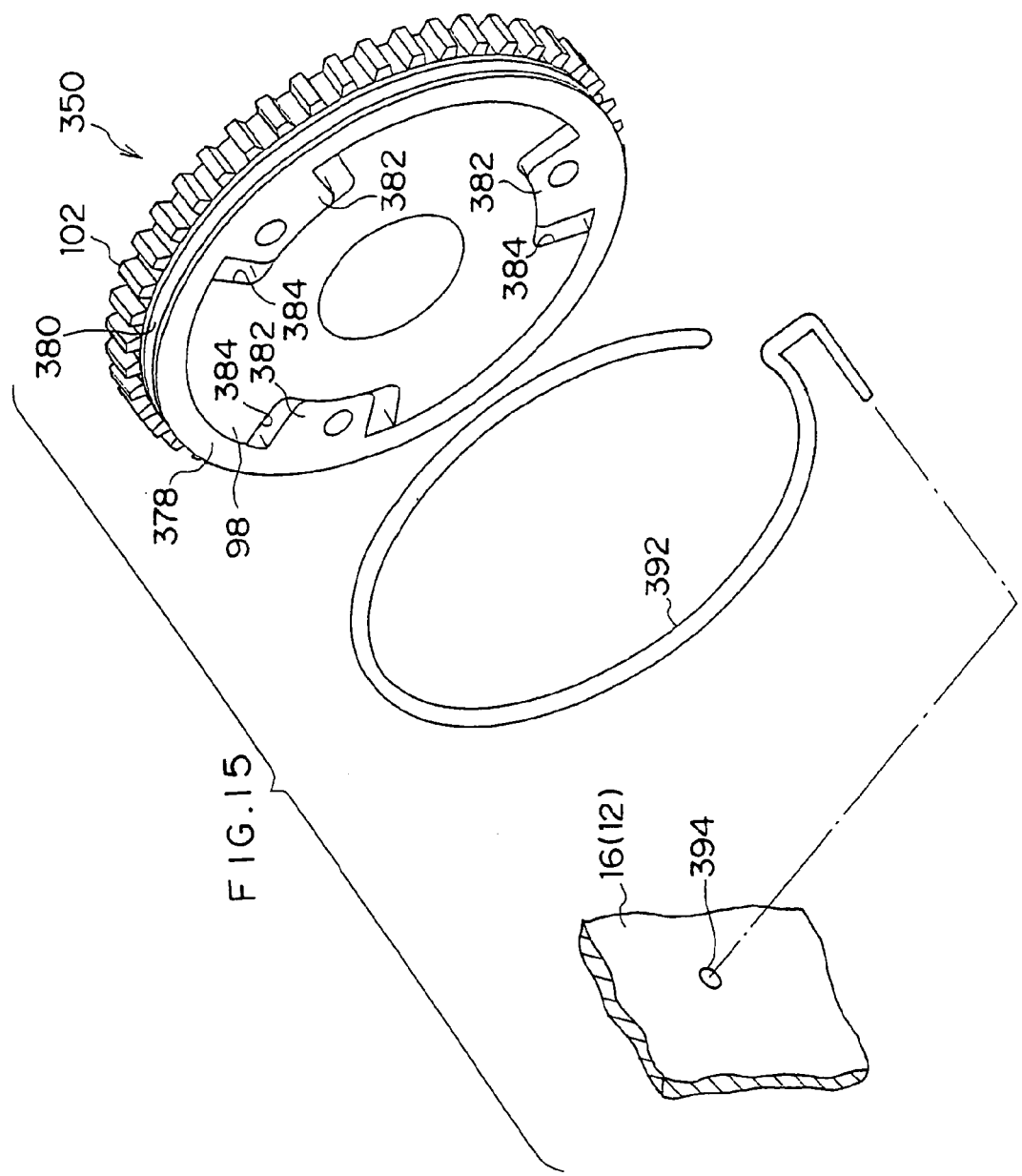

WEBBING RETRACTOR

CROSS-REFERENCE TO RELATED APPLICATION

This application claims priority under 35 USC 119 from Japanese patent Application No. 2002-202970, the disclosure of which is incorporated by reference herein.

BACKGROUND OF THE INVENTION

1. Field of the Invention

The present invention relates to a webbing retractor which structures a seat belt device for restraining, by an elongated, strip-shaped webbing belt, the body of a vehicle occupant who is seated in a seat of a vehicle or the like.

2. Description of the Related Art

A seat belt device which restrains, by an elongated, strip-shaped webbing belt, the body of a vehicle occupant who is seated in a seat of a vehicle, is equipped with a webbing retractor which is fixed to the vehicle body at the side of the seat. The webbing retractor has a spool (take-up shaft) whose axial direction runs, for example, substantially along the longitudinal direction of the vehicle. The proximal end side, in the longitudinal direction, of the webbing belt is anchored at the spool. The spool can take the webbing belt up in the form of a roll around the outer peripheral portion of the spool. When the seat belt device is not being used, the webbing belt can be accommodated in a state of being taken-up on the outer peripheral portion of the spool.

An urging member, such as a spiral spring or the like which urges the spool in a take-up direction in which the spool takes up the webbing belt, is provided at the webbing retractor. Due to the urging force of this urging member, the webbing belt is taken up and accommodated. In the state in which the webbing belt is applied to the body of a vehicle occupant, slack or the like of the webbing belt is eliminated by the urging force of the urging member.

On the other hand, a mechanism has been conceived in which, by taking-up a predetermined amount of the webbing belt onto the take-up shaft in a state of rapid deceleration of the vehicle or the like, the slight looseness known as "slack" or the like can be eliminated, and the force for restraining the body of the vehicle occupant by the webbing belt is increased such that the body of the vehicle occupant is held even more reliably. In such a mechanism, generally, the state of a rapid deceleration of the vehicle is sensed by an acceleration sensor, and the take-up shaft is forcibly rotated in the take-up direction on the basis of an electric signal from the acceleration sensor.

In contrast, a structure has been thought of in which the distance to another vehicle or an obstacle which is ahead is detected by a distance sensor or the like. When the distance to the vehicle or the obstacle which is ahead is less than a given value, a motor is operated, and the take-up shaft is rotated in the take-up direction by the torque of the motor.

Even in such a structure in which the take-up shaft is rotated in the take-up direction by the torque of a motor when the distance to a vehicle or an obstacle which is ahead is less than a given value, usually, the spool is rotated in the take-up direction by the urging force of the aforementioned urging member such as a spiral spring or the like. When the webbing belt is pulled out, the spool is rotated against the urging force of the urging member such as a spiral spring or the like. Thus, a clutch is provided between the motor and the spool so that the rotation of the spool at the time of usual taking-up and pulling-out of the webbing belt is not transmitted to the output shaft of the motor. Only in cases in which the motor is operated is the output shaft of the motor mechanically connected to the spool.

As a clutch mechanism used in such a structure, there is a structure in which an inertial mass body called an inertial plate is provided so as to be freely rotatable around the axis of the spool. In such a clutch mechanism, the inertial plate is provided so as to be able to rotate relative to both a driven shaft which is integral with the spool and a rotating body of a prime mover which rotates by receiving the rotation of the output shaft of the motor.

However, the other end of an urging member, such as a compression coil spring or the like whose one end is directly or indirectly engaged with the rotating body of the prime mover, is engaged with the inertial plate. When the rotating body of the prime mover rotates due to the torque of the motor, and, accompanying this rotation, the compression coil spring attempts to rotate, the urging force of the compression coil spring rotates the inertial plate.

However, the inertial plate attempts to maintain a stopped state by the inertia thereof. Thus, for example, when the rotating body of the prime mover suddenly rotates, relative rotation arises between the rotating body of the prime mover and the inertial plate which is attempting to maintain the stopped state by inertia. Interlockingly with this relative rotation, a connecting member, such as a pawl or the like which rotates together with the rotating body of the prime mover, is moved, and the connecting member is made to engage with the driven shaft. The torque of the motor is transmitted to the driven shaft, and consequently, to the spool.

However, in a structure using such an inertial plate, there is the condition that the rotating body of the prime mover must be rotated suddenly by the torque of the motor.

In order to satisfy such a condition, the rotating body of the prime mover and the output shaft of the motor must be directly connected without the torque of the motor being decelerated by a reduction gear or the like.

However, in the case of such a structure, if the clutch mechanism does not have a reduction mechanism, the rotation of the rotating body of the prime mover is transmitted to the driven shaft as well without being decelerated. Thus, the taking-up and the like of the webbing belt are carried out excessively rapidly.

SUMMARY OF THE INVENTION

In view of the aforementioned, an object of the present invention is to provide a webbing retractor which generates relative rotation between a prime mover rotating body and a rotating body such as an inertial plate or the like so as to reliably transmit rotation of the prime mover rotating body to a driven shaft, such that taking-up of a webbing belt by the driving force of a driving mechanism can be carried out.

A first aspect of the present invention is a webbing retractor for an elongated, strip-shaped webbing belt used for application to a body of a vehicle occupant, the webbing retractor comprising: a take-up shaft for taking the webbing belt up around itself, which take-up shaft is rotatably held, and to which one end of the webbing belt is anchored; a driven shaft connected to the take-up shaft; a prime mover rotating body rotatably supported relative to and coaxially with the driven shaft; a rotating member supported coaxially with both the prime mover rotating body and the driven shaft, and rotatable relative to both the prime mover rotating body and the driven shaft; an urging member, attached to the prime mover rotating body, for urging the rotating member in a direction of rotation of the prime mover rotating body when the prime mover rotating body is rotated; connecting members for connecting the prime mover rotating body and the driven shaft, by interlocking with relative rotation of the rotating member with respect to the prime mover rotating body, so as to transmit rotation of the prime mover rotating body to the driven shaft; a driving mechanism, including a drive source, for driving rotation of the prime mover rotating body in a predetermined direction; and a braking mechanism for braking rotation of the rotating member such that relative rotation of the rotating member with respect to the prime mover rotating body arises.

A second aspect of the present invention is a webbing retractor for a webbing belt, the webbing retractor having a take-up shaft, and by rotating the take-up shaft in one direction, the webbing retractor takes-up and accommodates, on the take-up shaft and from a proximal end side, a webbing belt which is elongated and strip-shaped and which is applied to a body of a vehicle occupant so as to restrain the body and which has a distal end and a proximal end, and due to the webbing belt being pulled toward a distal end side, the webbing retractor rotates the take-up shaft in another direction, and the webbing belt, which is taken-up on the take-up shaft, is pulled out, the webbing retractor comprising: a driven shaft connected to the take-up shaft coaxially and integrally; a prime mover rotating body which is substantially ring shaped and which is provided coaxially with the driven shaft so as to be able to rotate relative to the driven shaft; a rotating member which is able to rotate relative to and coaxially with both the prime mover rotating body and the driven shaft; an urging member which is attached to the prime mover rotating body and rotates together with the prime mover rotating body, and which urges the rotating member in a direction of rotation of the prime mover rotating body; connecting members which, interlockingly with relative rotation of the rotating member with respect to the prime mover rotating body, mechanically connect the prime mover rotating body and the driven shaft, and transmit rotation of the prime mover rotating body to the driven shaft; a driving mechanism having an output shaft which is connected one of directly and indirectly to the prime mover rotating body, and the driving mechanism rotates the output shaft by driving force of the driving mechanism; and a braking mechanism which, interlockingly with rotation of the output shaft, applies frictional force to the rotating member and impedes rotation of the rotating member.

The webbing retractor of the above-described aspect may further comprise a rotation transmitting mechanism which is provided between the output shaft and the prime mover rotating body, and which receives rotation from the output shaft and rotates, and which transmits rotation of the rotation transmitting mechanism to the prime mover rotating body.

In the webbing retractor having the above-described structure, the webbing belt, which is taken up onto the take-up shaft from the proximal end side thereof, is pulled from the distal end side thereof. The webbing belt is pulled-out while the take-up shaft is rotated in the pull-out direction, which is one direction around the axis thereof. By applying the pulled-out webbing belt to the body of a vehicle occupant, the body of the vehicle occupant is restrained by the webbing belt.

Further, when the state in which the pulled-out webbing belt restrains the body of the vehicle occupant is cancelled, and further, the take-up shaft is rotated in the take-up direction which is opposite to the aforementioned pull-out direction, the webbing belt is taken-up and accommodated in the form of a roll on the outer peripheral portion of the take-up shaft.

On the other hand, in the present webbing retractor, when the driving mechanism drives and the output shaft of the driving mechanism rotates and the rotation of the output shaft is transmitted to the prime mover rotating body and the prime mover rotating body, which is connected directly or indirectly to the output shaft, rotates. When the prime mover rotating body rotates, the urging member, which is attached to the prime mover rotating body, rotates in the direction of rotation of the prime mover rotating body.

The urging member urges the rotating member in the direction of rotation of the prime mover rotating body. Accordingly, basically, the rotating member can rotate coaxially with and relative to the prime mover rotating body and the driven shaft. However, when the urging member rotates accompanying the rotation of the prime mover rotating body, the urging member pushes the rotating member in the direction of rotation of the prime mover rotating body, and thereby attempts to rotate the rotating member in the direction of rotation of the prime mover rotating body.

Here, in the present webbing retractor, when the driving mechanism drives and the output shaft of the driving mechanism rotates, the braking mechanism operates, and the braking mechanism applies frictional force to the rotating member. This frictional force works to impede rotation of the rotating member. Thus, as described above, even if the urging member attempts to rotate the rotating member in the direction of rotation of the prime mover rotating body by the urging force of the urging member, the rotation of the rotating member is restricted by the frictional force which the braking mechanism applies to the rotating member. In this way, relative rotation arises between the prime mover rotating body and the rotating member.

When relative rotation arises between the prime mover rotating body and the rotating member, the connecting members mechanically connect the prime mover rotating body and the driven shaft. In this way, the rotation of the prime mover moving body is transmitted to the driven shaft, and the driven shaft, and accordingly, the take-up shaft, rotate. In this way, if the driven shaft rotates in the take-up direction for example, the webbing belt is taken up onto the take-up shaft by the driving force of the driving mechanism. If the driven shaft rotates in the pull-out direction, slack arises in the webbing belt which is wound on the take-up shaft, and the force by which the webbing belt restrains the body of the vehicle occupant decreases.

In this way, in the present webbing retractor, when the driving mechanism drives, relative rotation of the rotating member with respect to the prime mover rotating body can be reliably generated by the braking mechanism. In this way, the driving force (torque) of the driving mechanism can be reliably transmitted to the take-up shaft.

Further, in the webbing retractor of the above-described aspect, the braking mechanism may be structured so as to include a friction member which is substantially ring shaped and which is exposed to an exterior of the prime mover rotating body in a state in which the friction member is mechanically connected to the rotating member; and a braking member which is attached to one of the output shaft and the rotation transmitting member, and which, interlockingly with rotation of the one of the output shaft and the rotation transmitting member, moves so as to approach the friction member and slidingly contacts the friction member.

In the webbing retractor having the above-described structure, the friction member, which is exposed to the exterior of the prime mover rotating body, is mechanically connected to the rotating member. When the rotating member attempts to rotate, the friction member also attempts to rotate together therewith.

Here, when the driving mechanism drives and the output shaft rotates, the braking member, which is provided at the output shaft or is provided at the rotation transmitting mechanism disposed between the output shaft and the prime mover rotating body, moves so as to approach the friction member, interlockingly with the rotation of the output shaft or the rotating transmitting mechanism. In this way, the braking member slidingly contacts the friction member.

When the rotation of the friction member is restricted due to the frictional force which is applied from the braking member which slidingly contacts the friction member, rotation of the rotating member, to which the friction member is connected, is restricted indirectly. In this way, relative rotation arises between the prime mover rotating body and the rotating member.

Namely, in the present webbing retractor, in a way, braking force with respect to the rotating member, which is caused by the frictional force from the braking member, is applied indirectly to the rotating member via the friction member.

In the webbing retractor of the second aspect of the present invention, the braking mechanism can be structured so as to include a friction member which is provided at the exterior of the prime mover rotating body, and which is mechanically connected to the rotating member; a brake spring which is formed in a substantial ring shape in which a take-up direction side end portion and a pull-out direction side end portion around an axis of the driven shaft are apart from one another, and the brake spring has a spring property (elasticity), and an inner peripheral portion of the brake spring slidingly contacts the friction member; and a diameter forcibly reducing mechanism at which is anchored an end portion of the brake spring at one of the take-up direction side and the pull-out direction side, and which, interlockingly with rotation of the output shaft for rotating the take-up shaft in the other of the take-up direction and the pull-out direction, rotates the brake spring in the one direction with respect to the friction member, and reduces the diameter of the brake spring due to friction between the friction member and the brake spring.

In the webbing retractor having the above-described structure, the friction member, which is exposed at the exterior of the prime mover rotating body, is mechanically connected to the rotating member. When the rotating member attempts to rotate, the friction member also attempts to rotate together therewith.

The inner peripheral portion of the ring-shaped brake spring slidingly contacts the friction member. The end portion of the brake spring at one of the take-up direction side and the pull-out direction side is anchored at the diameter forcibly reducing mechanism. Here, in order to explain the present invention such that it can be understood more easily, explanation will be given with "the one" of the take-up direction and the pull-out direction being the "pull-out direction", and "the other" being the "take-up direction".

When, in order to rotate the take-up shaft in the take-up direction, the driving mechanism is operated and the output shaft rotates, interlockingly with the rotation of the output shaft, the diameter forcibly reducing mechanism makes the brake spring rotate in the pull-out direction relative to the friction member.

When relative rotation arises in this way, frictional force arises between the brake spring and the friction member. The frictional force works to impede rotation of the brake spring. Thus, in a case in which the pull-out direction side end portion is forcibly rotated in the pull-out direction with respect to the friction member, or in a case in which the pull-out direction side end portion of the brake spring does not attempt to rotate regardless of the fact that the take-up direction side end portion of the brake spring is rotated in the take-up direction due to the friction member attempting to rotate in the take-up direction, the brake spring reduces the gap which is formed between the pull-out direction side end portion and the take-up direction side end portion. The diameter of the entire brake spring is thereby reduced against the elasticity of the brake spring.

Due to the diameter of the brake spring being reduced, the brake spring tightens around the friction member. In this way, the frictional force between the friction member and the brake spring increases.

The frictional force, which has increased in this way, works to restrict rotation of the friction member in the take-up direction. Due to rotation of the friction member in the take-up direction being restricted by the frictional force, rotation in the take-up direction of the rotating member, to which the friction member is connected, is restricted. In this way, relative rotation arises between the prime mover rotating body and the rotating member.

The braking mechanism may be structured so as to include a lever. The end portion of the brake spring at one of the take-up direction side and the pull-out direction side is anchored at the distal end side of the lever. The proximal end side of the lever is indirectly connected to the driving mechanism. The lever may be rotated by the driving force of the driving mechanism, and may pull the brake spring toward the other of the take-up direction side and the pull-out direction side.

In the webbing retractor having the above-described structure, for example, when the prime mover rotating body rotates in the take-up direction (which is the other of the take-up direction and the pull-out direction) due to the driving force of the driving mechanism, and the rotating member thereby attempts to rotate in the take-up direction, accompanying this, the friction member connected to the rotating member attempts to rotate in the take-up direction. Moreover, the friction member attempts to rotate the brake spring in the take-up direction due to the friction between the friction member and the brake spring.

On the other hand, as described above, when the driving mechanism drives and the output shaft rotates, the lever rotates in the pull-out direction due to the rotation of the output shaft. Due to the rotation of the lever in the pull-out direction, the pull-out direction side end portion of the brake spring which is anchored at the distal end side of the lever, is pulled in the pull-out direction, and the brake spring attempts to rotate in the pull-out direction.

In this way, due to the brake spring and the friction member attempting to rotate in mutually opposite directions, the frictional force between the brake spring and the friction member suddenly increases. The frictional force, which has increased in this way, works to restrict rotation of the friction member in the take-up direction. Due to the rotation of the friction member in the take-up direction being restricted by this frictional force, the rotation in the take-up direction of the rotating member, to which the friction member is connected, is restricted. In this way, relative rotation arises between the prime mover rotating body and the rotating member.

Or, the webbing retractor may have a frame which directly or indirectly supports the take-up shaft, and the diameter forcibly reducing mechanism may be structured such that the one side end portion of the brake spring is anchored at the frame.

In the webbing retractor having the above-described structure, for example, when the prime mover rotating body rotates in the take-up direction (which is the other of the take-up direction and the pull-out direction) due to the driving force of the driving mechanism, and the rotating member thereby attempts to rotate in the take-up direction, accompanying this, the friction member connected to the rotating member attempts to rotate in the take-up direction. Moreover, the friction member attempts to rotate the brake spring in the take-up direction due to the friction between the friction member and the brake spring.

Here, in the present webbing retractor, the end portion of the brake spring at the pull-out direction (the one of the take-up direction and the pull-out direction) side is anchored at the frame which directly or indirectly supports the take-up shaft. Thus, even if the brake spring attempts to rotate in the take-up direction, the end portion of the brake spring at the pull-out direction side cannot rotate following this rotation.

Accordingly, due to the brake spring attempting to rotate in the take-up direction in the state in which the pull-out direction side end portion thereof is anchored, the gap formed between the pull-out direction side end portion and the take-up direction side end portion of the brake spring narrows. The diameter of the entire brake spring is thereby reduced in opposition to the elasticity of the brake spring.

Due to the diameter of the brake spring being reduced, the brake spring tightens around the friction member. In this way, the frictional force between the friction member and the brake spring increases.

The frictional force, which has increased in this way, works to restrict rotation of the friction member in the take-up direction. Due to rotation of the friction member in the take-up direction being restricted by this frictional force, rotation in the take-up direction of the rotating member, to which the friction member is connected, is restricted. In this way, relative rotation arises between the prime mover rotating body and the rotating member.

In this way, in the above-described webbing retractor, the frame can be included in the diameter forcibly reducing mechanism, and the brake spring can be anchored at the frame, and the rotating member can be made to rotate relative to the prime mover rotating body. Moreover, due to the frame being included in the diameter forcibly reducing mechanism, there is no need to provide a separate, special member for forming the diameter forcibly reducing mechanism, and the webbing retractor can be made compact and lightweight.

Note that, in the above description, for convenience of explanation, "the one" of the take-up direction and the pull-out direction was the "pull-out direction", and "the other" was the "take-up direction". However, the present invention is established even if, conversely, "the one" is the "take-up direction" and "the other" is the "pull-out direction". In this case, the phrases of "pull-out direction" and "take-up direction" in the above explanation are merely reversed, and detailed description of such a case will therefore be omitted.

BRIEF DESCRIPTION OF THE DRAWINGS

FIG. 3A shows a usual state and FIG. 3B shows a sliding-contact state.

FIG. 15 is an exploded perspective view showing the basics of the structure of a braking mechanism of the webbing retractor relating to the third embodiment of the present invention.

DETAILED DESCRIPTION OF THE INVENTION

Figure 1:
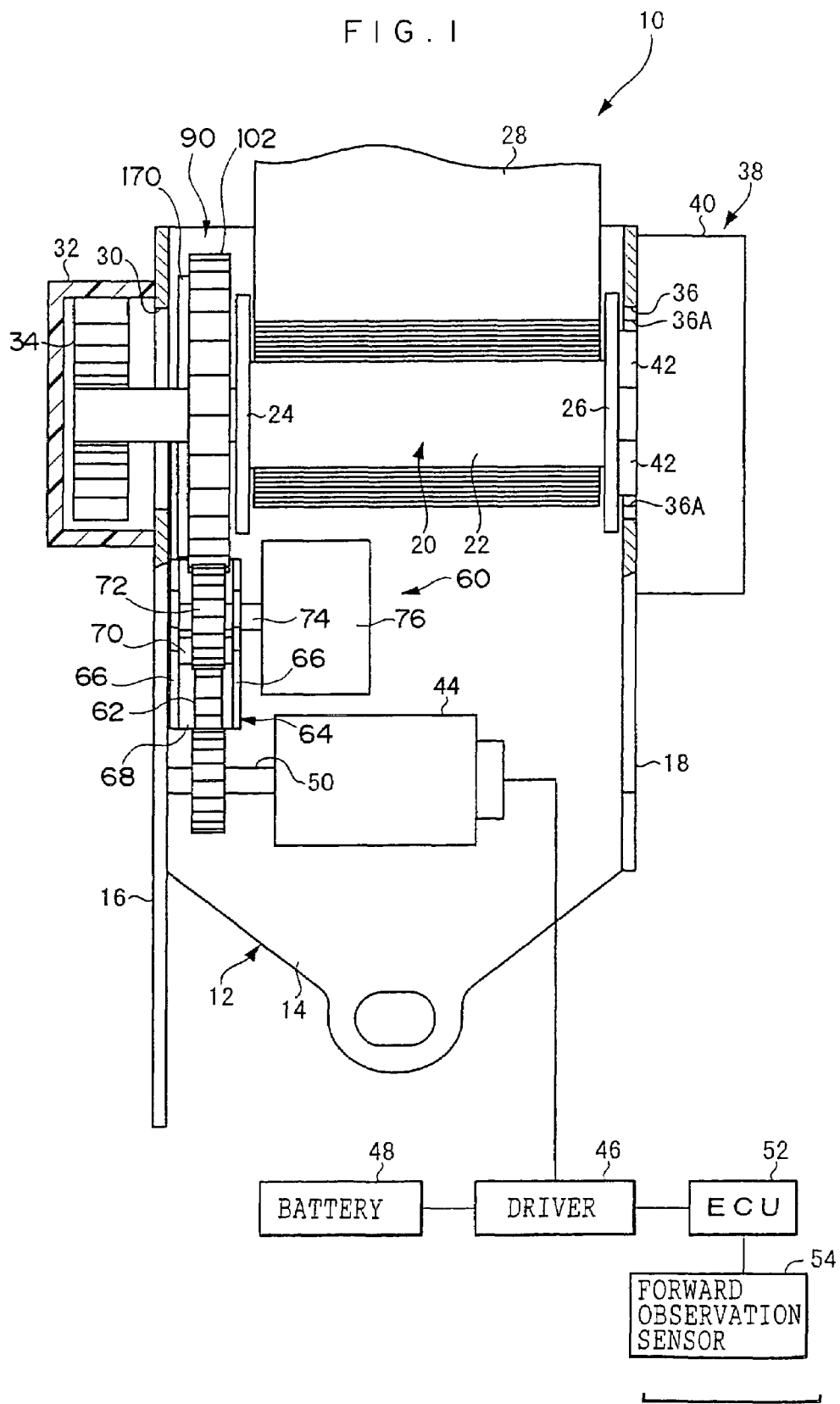
FIG. 1 is a front view showing the basics of the structure of a webbing retractor relating to a first embodiment of the present invention.

The embodiments of the present invention may have the following features.

In the webbing retractor of one embodiment, the driven shaft is rotatably connected integrally with the take-up shaft. The urging member has one end and another end and is elastically deformable, and the one end is attached to the prime mover rotating body, and the other end is held at the rotating member so as to be able to push the rotating member. The urging member has a coil spring.

The driven shaft has a peripheral surface, and the connecting members are held at the prime mover rotating body so as to be able to approach and move away from the driven shaft, and when the prime mover rotating body is rotated, the connecting members contact the peripheral surface of the driven shaft due to the relative rotation, and connect the prime mover rotating body and the driven shaft. The following structure is possible: a plurality of teeth are formed at the peripheral surface of the driven shaft, and the connecting members have pawl shapes which can engage with any of the teeth, and at least one of the connecting members contacts the tooth of the driven shaft so as to engage with the tooth, and connects the prime mover rotating body and the driven shaft.

In the webbing retractor of another embodiment, the connecting members are roller-shaped, and due to the relative rotation, the connecting members are pressed by the peripheral surface of the driven shaft and connect the prime mover rotating body and the driven shaft, and rotation of the prime mover rotating body is thereby transmitted to the driven shaft.

In the webbing retractor of one embodiment, due to the braking mechanism applying frictional force to the rotating member, rotation of the rotating member is braked. The braking mechanism may brake the rotating member when the prime mover rotating body is driven to rotate at greater than a predetermined speed. The braking mechanism may connect such that power can be transmitted from the driving mechanism, i.e., motion of the braking mechanism for braking operation is transmitted from the driving mechanism. The braking mechanism may brake the rotating member interlockingly with driving and rotating of the prime mover rotating body by the driving mechanism.

In the webbing retractor of one embodiment, the rotating member has a friction member which is attached to the rotating member and rotates integrally with the rotating member, and the braking mechanism has a braking member which slidingly contacts the friction member, and the braking mechanism brakes due to the braking member slidingly contacting the friction member. The following structure is possible: the friction member is substantially ring shaped, and the braking member is substantially shaped as a ring having one end and another end, and the braking member is disposed so as to surround one portion of an outer peripheral surface of the friction member, and in a state in which the one end of the braking member is held at the outer peripheral surface of the friction member, the other end of the braking member is connected to the driving mechanism and is pulled in a direction of decreasing a diameter of the braking member when the driving mechanism operates.

The webbing retractor of another embodiment further comprises a frame which is fixed, and the friction member is substantially ring shaped, and the braking member is substantially shaped as a ring having one end and another end, and the braking member is disposed so as to surround one portion of an outer peripheral surface of the friction member, and in a state in which the one end of the braking member is held at the outer peripheral surface of the friction member, the other end of the braking member is anchored at the frame so as to be pulled in a direction of decreasing a diameter of the braking member when the friction member is rotated.

In the webbing retractor of one embodiment, the prime mover rotating body has an external gear which is ring shaped and has external teeth for connection to the driving mechanism such that the external gear can be driven and rotated; a base portion having a holding portion for holding the plurality of connecting members, the base portion being pivotally supported coaxially with the rotating member; and at least one torque limiter provided between the external gear and the base portion, so as to be able to transmit torque in a predetermined range to the base portion from the external gear.

The webbing retractor of one embodiment further comprises a control unit controlling operation of the driving mechanism, and when a rate of change in deceleration at a time when the vehicle decelerates is greater than or equal to a predetermined value, the control unit effects control so as to cause the driving mechanism to operate. Further, when a distance to an obstacle which is positioned ahead of the vehicle is less than a predetermined value, the control unit effects control so as to cause the driving mechanism to operate.

Hereinafter, embodiments of the present invention will be described in detail with reference to the drawings.

STRUCTURE OF FIRST EMBODIMENT (Overall Structure of Webbing Retractor 10)

A front sectional view showing the overall structure of a webbing retractor 10 relating to a first embodiment of the present invention is shown in FIG. 1. As shown in FIG. 1, the webbing retractor 10 has a frame 12. The frame 12 has a back plate 14 which is substantially plate-shaped. The webbing retractor 10 is mounted to a vehicle body by the back plate 14 being fixed to the vehicle body by unillustrated fasteners such as bolts or the like. A pair of leg plates 16, 18 extend parallel to one another from the transverse direction ends of the back plate 14. A spool 20, which serves as a take-up shaft and is manufactured by die casting or the like, is disposed rotatably between the leg plates 16, 18.

The spool 20 is structured by a spool main body 22 and a pair of flange portions 24, 26, and is formed in a drum-shape on the whole. The spool main body 22 is substantially hollow cylindrical. The pair of flanges 24, 26 are formed in substantial disc shapes at the end portions of the spool main body 22.

The proximal end portion of a webbing belt 28, which is formed in the shape of an elongated strip, is fixed to the spool main body 22 between the flange portions 24, 26. When the spool 20 is rotated in one direction around the axis thereof, the webbing belt 28 is taken-up in the form of a roll on the outer peripheral portion of the spool main body 22 from the proximal end side of the webbing belt 28. Further, if the webbing belt 28 is pulled from the distal end side thereof, the webbing belt 28, which is taken-up on the outer peripheral portion of the spool main body 22, is pulled-out. Accompanying this, the spool 20 rotates opposite to the direction of rotation at the time of taking-up the webbing belt 28. (Hereinafter, for convenience of explanation, the direction of rotation at the time of taking-up the webbing belt 28 will be called the "take-up direction", and is denoted by arrow A in the related drawings. The direction of rotation of the spool 20 at the time when the webbing belt 28 is pulled out will be called the "pull-out" direction for convenience of explanation, and is denoted by arrow B in the related drawings.)

The flange portion 24 one end side of the spool 20, which is at the side opposite the flange portion 26 side of the spool 20, passes substantially coaxially through a circular hole 30, which is formed in the leg plate 16, and projects to the exterior of the frame 12. A case 32 is disposed at the outer side of the frame 12 at the leg plate 16 side. The case 32 is disposed so as to oppose the leg plate 16 along the axial direction of the spool 20, and is fixed to the leg plate 16. The case 32 is, on the whole, open toward the leg plate 16 side. The one end side of the spool 20 which passes through the circular hole 30 enters into the inner side of the case 32, and is rotatably supported by the case 32.

Moreover, a spiral spring 34 is disposed at the interior of the case 32. The end portion, at the outer side in the direction of the spiral, of the spiral spring 34 is anchored on the case 32. The end portion, at the inner side in the direction of the spiral, of the spiral spring 34 is anchored on the spool 20.

When the spool 20 is rotated in the pull-out direction from a neutral state in which no particular load is applied, urging force in the take-up direction arises, and the spiral spring 34 urges the spool 20 in the take-up direction. Accordingly, basically, when the tensile force applied to the webbing belt 28 for pulling the webbing belt 28 out from the spool 20 is released, the urging force of the spiral spring 34 rotates the spool 20 in the take-up direction, and the webbing belt 28 is taken-up onto the spool 20.

On the other hand, the flange portion 26 side other end side of the spool 20, which is opposite the flange portion 24 side thereof, passes substantially coaxially through an internal teeth ratchet hole 36 formed in the leg plate 18, and projects at the exterior of the frame 12. A lock mechanism 38 is provided at the outer side of the frame 12 at the leg plate 18 side. The lock mechanism 38 has a case 40. The case 40 is disposed so as to oppose the leg plate 18 along the axial direction of the spool 20, and is fixed to the leg plate 18. Respective members forming the lock mechanism 38, such as an inertial plate or an external gear, an acceleration sensor, and the like (all of which are unillustrated), are accommodated at the inner side of the case 40. Due to the spool 20 rotating suddenly in the take-up direction, the inertial plate within the case 40 rotates relative to the spool 20, or the acceleration sensor detects a state of rapid deceleration of the vehicle and the inertial plate is forcibly rotated within the case 40 relative to the spool 20.

A pair of lock plates 42 are provided at the inner side of the ratchet hole 36. The lock plates 42 are supported by a lock base which is provided within the case 40 and rotates integrally with the spool 20. When the inertial plate within the case 40 rotates in the pull-out direction relative to the lock base, the inertial plate is guided by guide portions formed at the lock base, and approaches the inner peripheral portion of the ratchet hole 36. External teeth formed at the lock plates 42 mesh with the internal teeth formed at the inner peripheral portion of the ratchet hole 36. Due to the external teeth formed at the lock plates 42 meshing with the internal teeth formed at the inner peripheral portion of the ratchet hole 36 in this way, rotation of the lock base in the pull-out direction is restricted, and accordingly, rotation of the spool 20 is restricted.

On the other hand, a motor 44 serving as a drive source is disposed beneath the spool 20 between the leg plate 16 and the leg plate 18. The motor 44 is electrically connected via a driver 46 to a battery 48 mounted in the vehicle. Due to current from the battery 48 flowing to the motor 44 via the driver 46, the motor 44 rotates an output shaft 50 in the forward direction or the reverse direction. The driver 46 is connected to an ECU 52 formed by a microcomputer or the like. The ECU 52 is connected to a forward observation sensor 54.

The forward observation sensor 54 is provided in a vicinity of the front end portion of the vehicle, and emits infrared rays toward the region in front of the vehicle, and receives the infrared rays which have been reflected by another vehicle or an obstacle which has stopped or is traveling in front of the vehicle. (Hereinafter, such objects, including vehicles which are traveling or have stopped, will be called "obstacles" for convenience of explanation.) The ECU 52 computes the distance to the obstacle ahead on the basis of the time required for the forward observation sensor 54 to receive light from the time the forward observation sensor 54 emitted the infrared rays.

On the basis of an electrical signal outputted from the forward observation sensor 54, the ECU 52 operates the driver 46 and controls the motor 44.

(Structure of Braking Mechanism 60)

Figure 2:
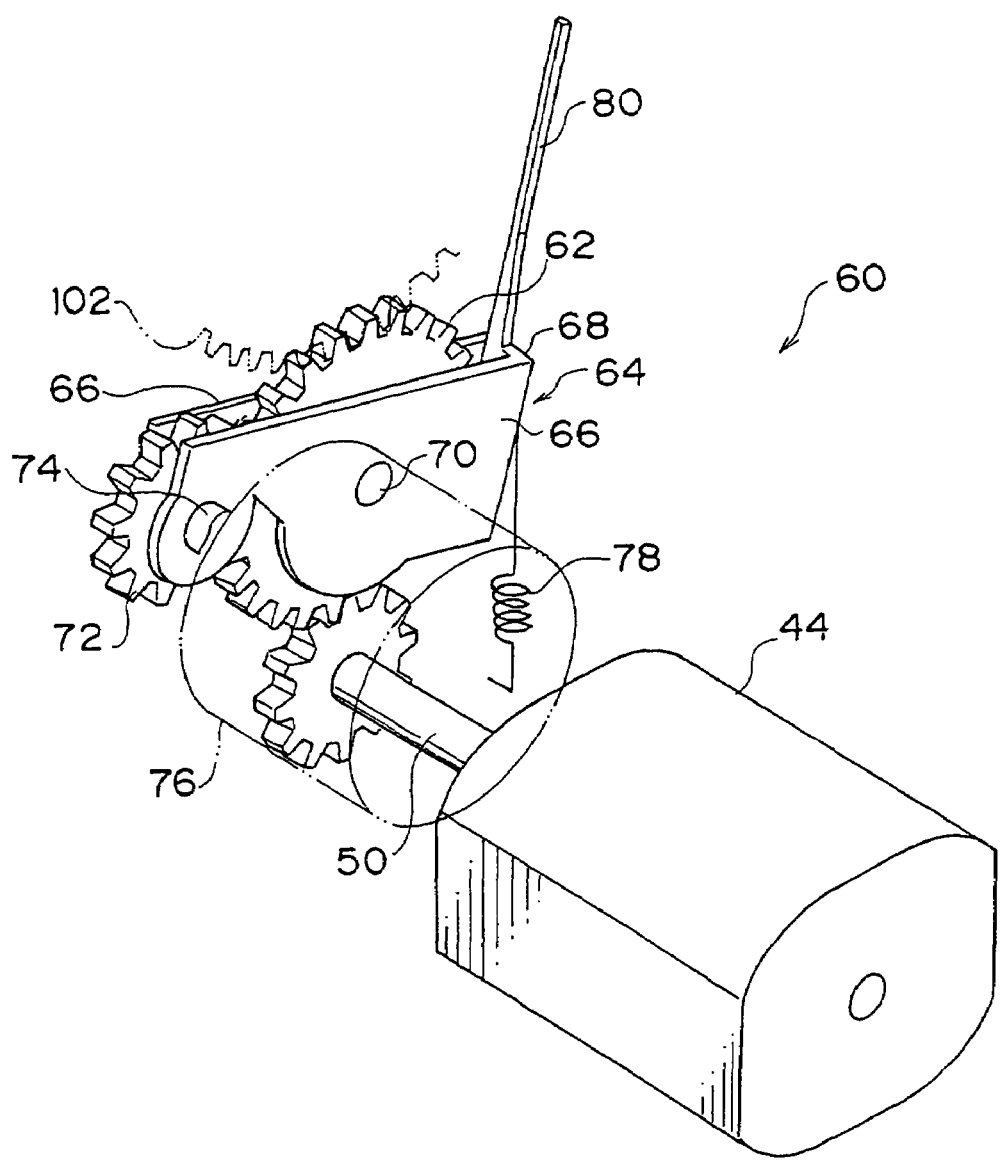
FIG. 2 is a perspective view showing the basics of a braking mechanism of the webbing retractor relating to the first embodiment of the present invention.
Figure 3B:
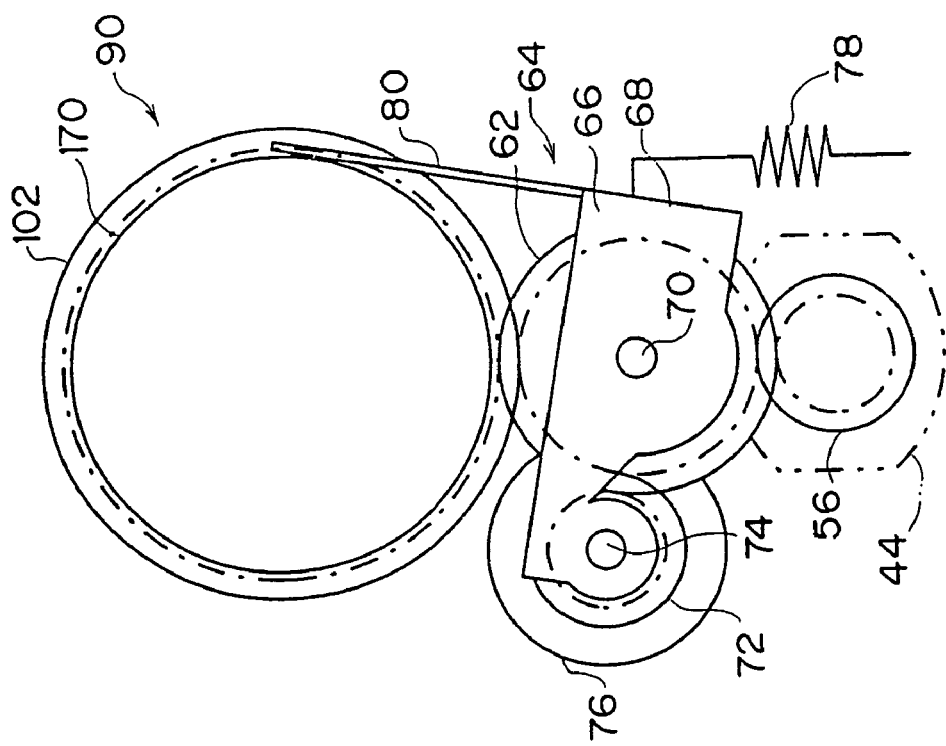
FIGS. 3A and 3B are side views showing the basics of the structure of the braking mechanism, where
Figure 3A:
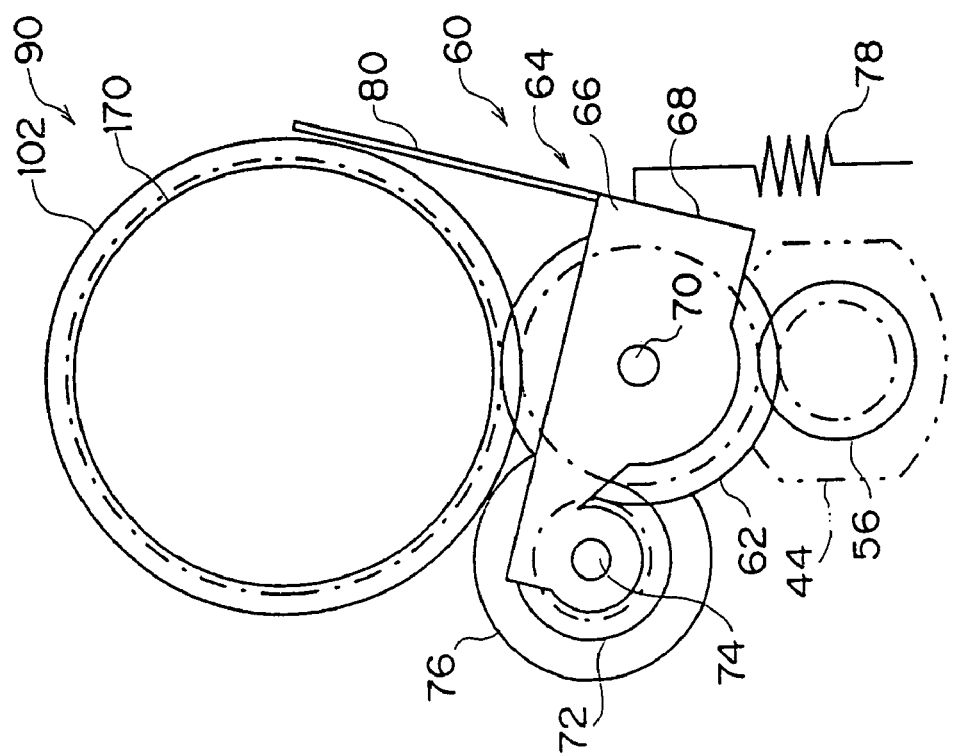

On the other hand, a gear 56 is provided coaxially and integrally with the distal end portion of the output shaft 50 of the motor 44. The gear 56 meshes with a gear 62 which has external teeth and which forms a braking mechanism 60. As shown in FIGS. 2, 3A and 3B, the braking mechanism 60 has a frame 64. The frame 64 has a pair of side walls 66 which are parallel to and oppose the leg plates 16, 18 of the frame 12. The side walls 66 are connected integrally to the rear surface side of the frame 12 by a back wall 68. On the whole, the frame 64 is formed, in plan view, in a substantially concave shape which opens toward the front surface side of the frame 12.

The gear 62 is provided such that the center of rotation thereof is positioned between the side walls 66, and is rotatably supported by a shaft 70 which passes through the side walls 66 and is supported at the leg plate 16 of the frame 12. The gear 62 has a larger diameter than and more teeth than the gear 56. Accordingly, the rotation of the gear 56 is decelerated by being transmitted to the gear 62. Moreover, a gear 72 is disposed at the side of the gear 62 opposite the side at which the back wall 68 of the frame 64 is provided.

The gear 72 meshes with the gear 62 in a state in which the gear 72 is pivotally supported by a shaft 74 whose both ends are supported at the side walls 66. Accordingly, the gear 72 can rotate around the gear 62 due to the rotation of the gear 62 being transmitted thereto. Moreover, the shaft 74 which pivotally supports the gear 72 extends to the interior of the frame 12. A weight 76, which is formed in the shape of a solid cylinder and which is substantially coaxial with the shaft 74, is fixed integrally to this distal end portion of the shaft 74. The weight 76 is integral with the gear 72 via the shaft 74. The self-weight of the gear 72 and the weight of the weight 76 are applied to the gear 72.

On the other hand, one end of a tension coil spring 78 is anchored on the back plate 68 of the frame 64. The other end of the tension coil spring 78 is fixed to the leg plate 16 at a position which is lower than the one end of the tension coil spring 78. The urging force of the tension coil spring 78 is greater than the gravity based on the weight of the weight 76 and the self-weight of the gear 72 which are applied to the gear 72. The urging force is applied such that the rear wall 68 side of the frame 64 is pulled downward against the gravity applied to the gear 72.

Further, a braking piece 80, which is shaped as a plate having a narrow width and which serves as a braking member, extends from the top end portion of the rear wall 68. The braking piece 80 structures a clutch 90 which serves as a clutch mechanism and will be described later. The braking piece 80 restricts rotation of a friction ring 170 due to friction at the time when the braking piece 80 abuts the outer peripheral portion of the friction ring 170 which structures the clutch mechanism and serves as a friction member.

(Structure of Clutch 90)

On the other hand, as shown in FIG. 1, the clutch 90 is provided at the radial direction side of the gear 62. Hereinafter, the clutch 90 will be described with reference to FIGS. 4 through 7.

Figure 4:
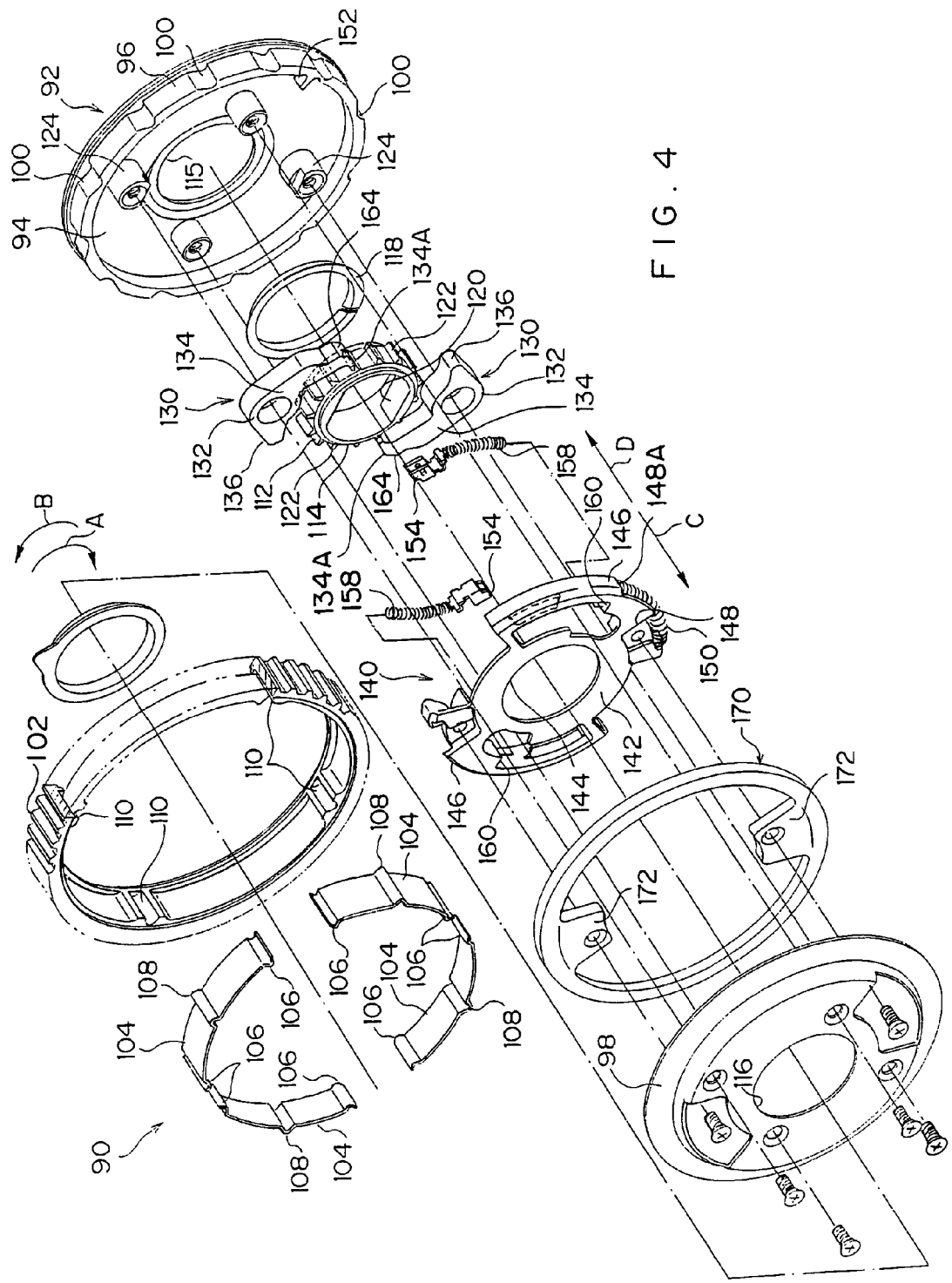
FIG. 4 is an exploded perspective view of a clutch mechanism of the webbing retractor relating to the first embodiment of the present invention.

As shown in FIG. 4, the clutch 90 has a base plate 92 serving as an intermediate rotating body. The base plate 92 is formed in the shape of a hollow cylinder which has a bottom and whose axial direction dimension is extremely short (or in the shape of a shallow tray). A substantially ring-shaped peripheral wall 96, which serves as an intermediate peripheral wall, is formed along the outer peripheral portion of a disc-shaped base portion 94 of the base plate 92. A cover 98, which is shaped as a thin disc, is attached to the open end at one axial direction end side of the base plate 92 (the arrow C direction side in FIG. 4), such that the open end of the base plate 92 is basically closed.

Figure 5:
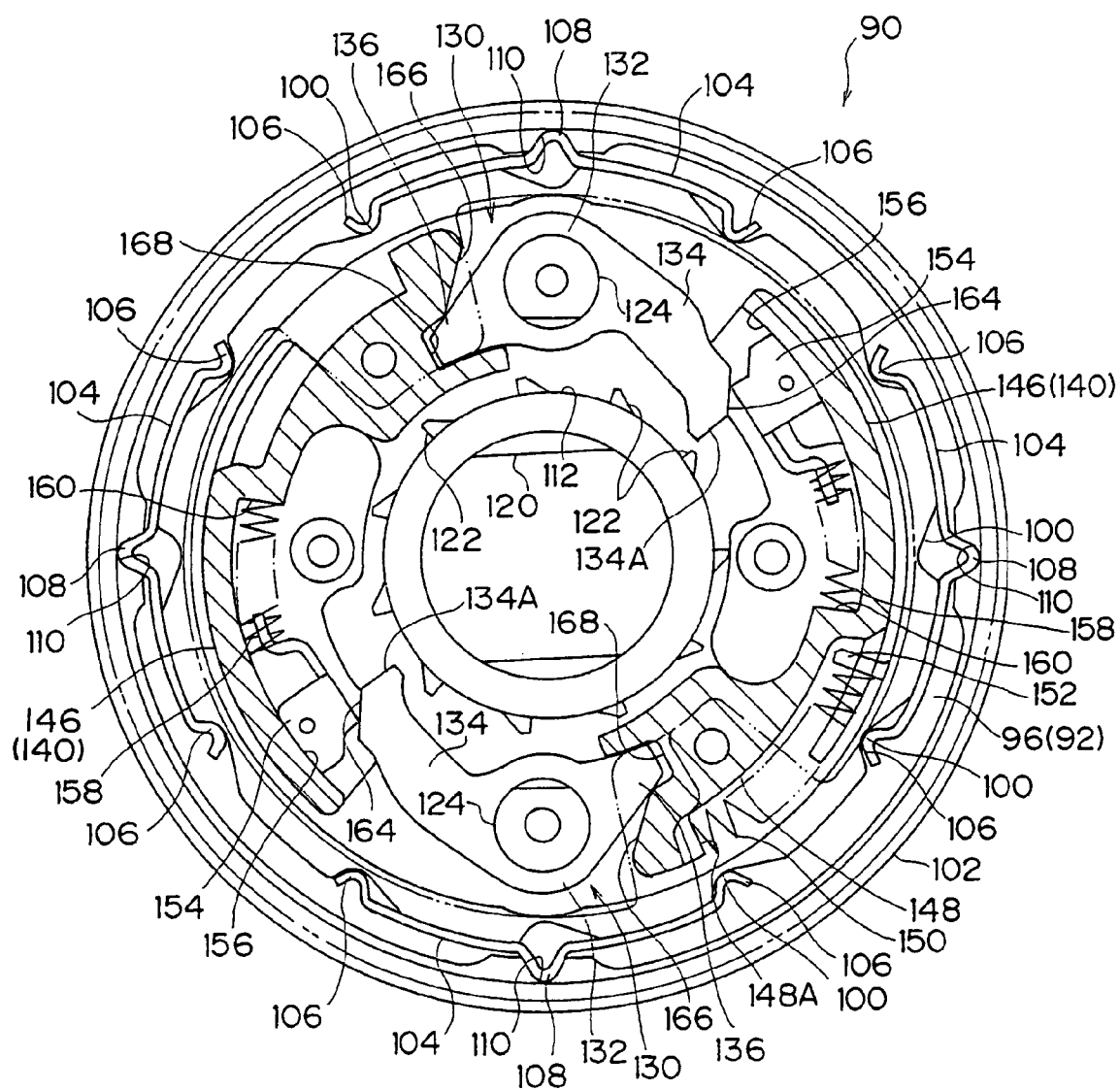
FIG. 5 is a side view showing the structure of the clutch mechanism.
Figure 6:
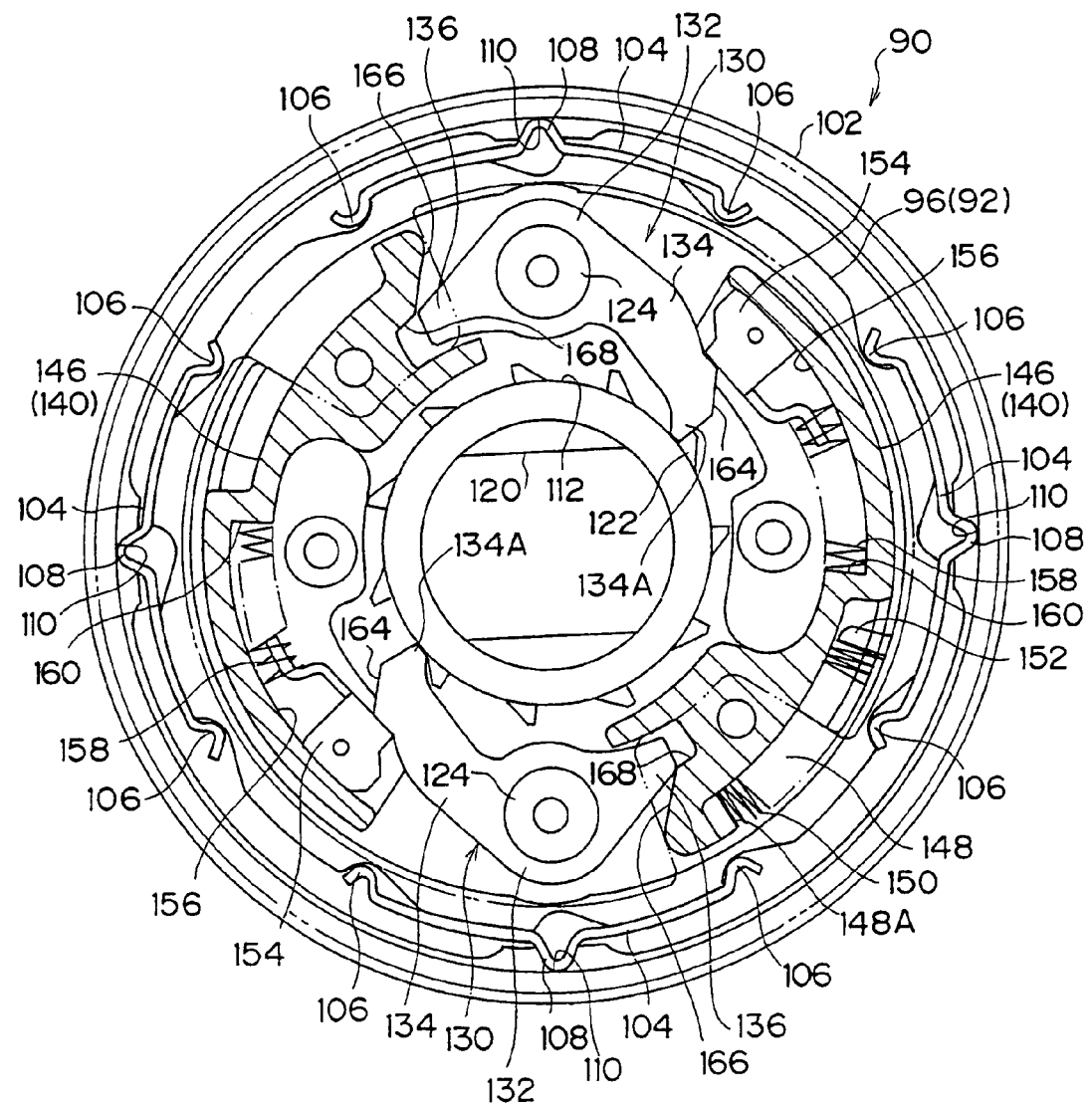
FIG. 6 is a side view of the clutch mechanism of FIG. 5, and shows a state in which connecting members are engaged with a driven shaft.
Figure 7:
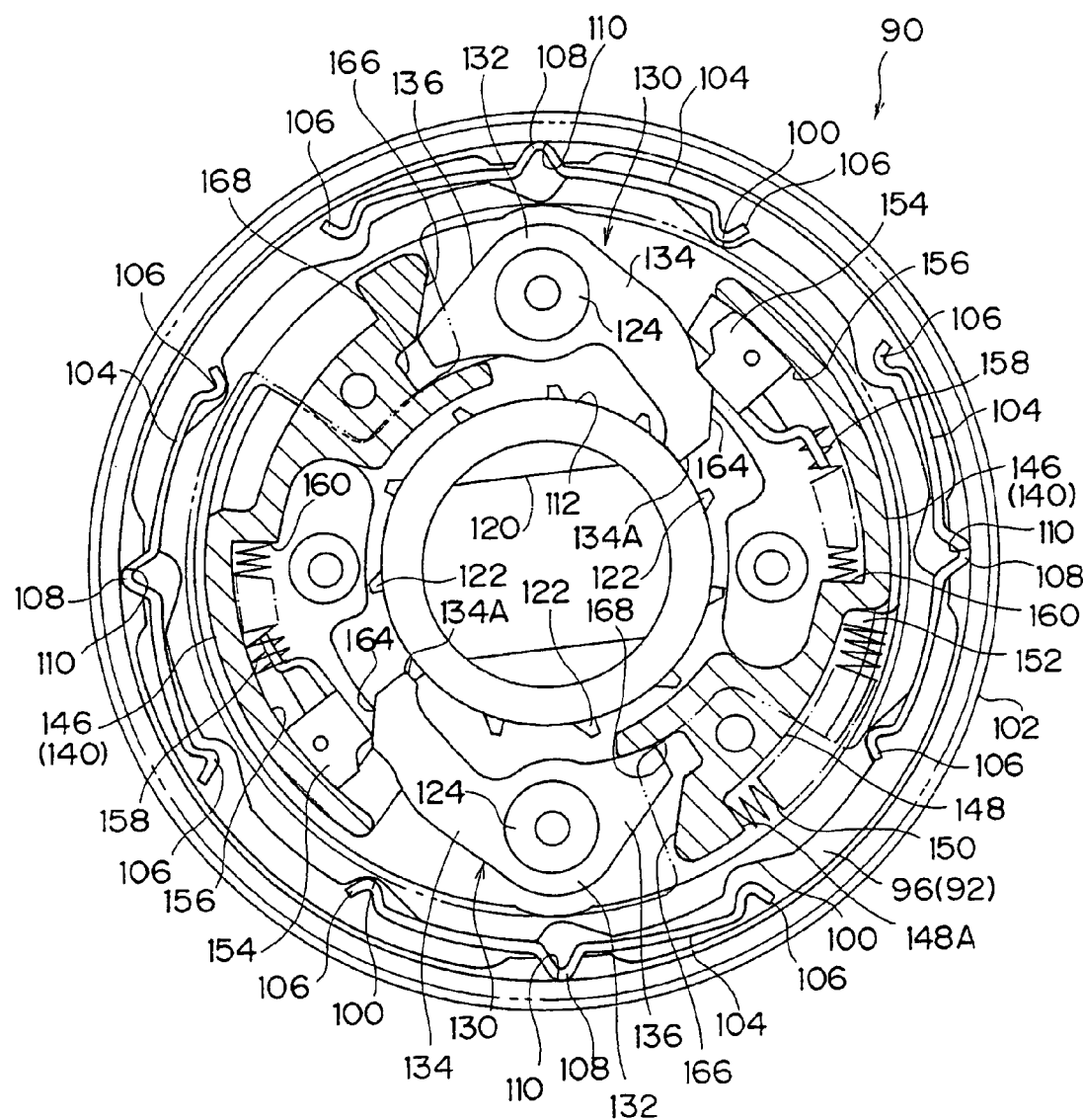
FIG. 7 is a side view of the clutch mechanism of FIG. 5, and shows a state in which one connecting member has ridden up on an addendum of an external tooth of the driven shaft.

Engaging recesses 100 are formed at uniform intervals along the peripheral direction in the outer peripheral portion of the peripheral wall 96. An external gear 102 serving as a prime mover rotating body is provided at the outer side of the peripheral wall 96. The external gear 102 is formed in a substantial ring shape whose number of teeth is sufficiently larger than that of the gear 62, and is disposed coaxially with respect to the base plate 92. The inner diameter dimension of the external gear 102 is sufficiently larger than the outer diameter dimension of the peripheral wall 96. An annular gap is formed between the inner peripheral portion of the external gear 102 and the outer peripheral portion of the peripheral wall 96. As shown in FIGS. 5 through 7, a plurality of torque limiters 104 are disposed intermittently in the peripheral direction in this annular gap.

As shown in FIGS. 4 through 7, the torque limiters 104 are plate-shaped metal pieces having thin widths and having a spring property, and the widths thereof are smaller than the axial direction dimension of the external gear 102. Engaging portions 106, which can enter into the aforementioned engaging recesses 100, are formed at the both longitudinal direction end portions of each of the torque limiters 104. Further, an engaging projection 108, which is bent as if to project out in a direction substantially opposite to the projecting direction of the engaging portions 106, is formed substantially at the longitudinal direction center of each of the torque limiters 104.

Engaging recesses 110 are formed at the inner peripheral portion of the external gear 102 in correspondence with the engaging projections 108. Due to the engaging portions 106 entering into the engaging recesses 100 in the state in which the engaging projections 108 are in the engaging recesses 110, the base plate 92 and the external gear 102 are connected substantially integrally via the torque limiters 104. In this way, when the external gear 102 attempts to rotate relative to the base plate 92 around the axis of the base plate 92, the torque limiters 104 also of course attempt to rotate integrally together with the external gear 102.

However, due to the engaging portions 106 of the torque limiters 104 being in the engaging recesses 100, when the engaging portions 106 attempt to rotate along the peripheral direction of the peripheral wall 96, the engaging recesses 100 interfere with the engaging portions 106 such that rotation of the engaging portions 106 is restricted. In this way, relative rotation of the external gear 102 with respect to the base plate 92 is restricted, and basically, the external gear 102 and the base plate 92 are connected integrally.

However, as described above, because the torque limiters 104 are metal pieces having a spring property, if the torque generated by the relative rotation of the external gear 102 with respect to the base plate 92 is large enough to pull the engaging portions 106 out from the engaging recesses 100 against the spring force (urging force) of the torque limiters 104, the interference of the engaging recesses 100 with the engaging portions 106 is released. Therefore, relative rotation of the external gear 102 with respect to the base plate 92 becomes possible.

On the other hand, an adapter 112, which is substantially hollow cylindrical and serves as a driven shaft, is disposed substantially coaxially with the base plate 92 at the inner side of the base plate 92. On the whole, the axial direction one end (the arrow D direction side in FIG. 4) of the adapter 112 is pivotally supported at a circular hole 115 formed in the center of the base portion 94 (the base plate 92). A tubular portion 114, which is hollow cylindrical and is formed coaxially at the other end of the adapter 112, is pivotally supported at a circular hole 116 formed in the cover 98.

A spacer 118, which is formed in a ring shape and of a synthetic resin material, is disposed between the adapter 112 and the base portion 94 of the base plate 92. The spacer 118 is pivotally supported by the tubular portion 114 of the adapter 112. One axial direction end surface of the spacer 118 abuts the base portion 94, whereas the other axial direction end surface abuts the end surface of the connecting portion where the main body portion of the adapter 112 is connected to the tubular portion 114.

A fit-together hole 120, which passes through along the axial direction of the adapter 112, is formed in the adapter 112. The other axial direction end of the spool 20 is fit into the fit-together hole 120, such that the adapter 112 and the spool 20 are connected together coaxially and integrally. Further, a plurality of external teeth 122, which is an odd number of teeth, are formed at uniform intervals at the outer peripheral portion of the adapter 112.

Moreover, a pair of bosses 124 are formed at the base portion 94 of the base plate 92 at the radial direction outer side of the adapter 112. Each boss 124 is formed as a substantially hollow cylinder, and stands erect from the base portion 94 toward one side in the axial direction thereof. These bosses 124 are formed so as to oppose one another across the circular hole 115. A pawl 130 serving as a connecting member is provided at each boss 124.

The pawl 130 has a main body 132. The main body 132 is formed in the shape of a ring whose inner diameter dimension is extremely slightly larger than the outer diameter dimension of the boss 124. Due to the main body 132 being fit together with the boss 124 such that the boss 124 passes through the main body 132, the pawl 130 is pivotally supported so as to be freely rotatable around the boss 124.

A connecting piece 134 is formed at a portion of the outer periphery of the main body 132. The connecting piece 134 is formed so as to extend, with respect to the main body 132, toward the spool 20 take-up direction side, in the state in which the main body 132 is pivotally supported at the boss 124. Moreover, the connecting piece 134 is formed such that, due to the main body 132 rotating over a predetermined angle in the take-up direction around the boss 124, the corner portion of a distal end 134A abuts the outer peripheral portion of the adapter 112 between the external tooth 122 and the external tooth 122 of the adapter 112.

The distal end 134A of the connecting piece 134 is formed as an inclined surface which is inclined so as to correspond to the pull-out direction side surfaces of the teeth of the adapter 112. Due to the distal end 134A abutting and interfering with the external tooth 122, rotation of the adapter 112 in the pull-out direction is restricted.

Here, as described above, the bosses 124 are formed so as to oppose one another across the circular hole 115. Therefore, in a state in which the corner portions of the distal ends 134A of the pawls 130 which have basically the same configurations contact the outer peripheral surface of the adapter 112, the distal end 134A of one of the pawls 130 is positioned, across the axial center of the adapter 112, at the opposite side of the distal end 134A of the other of the pawls 130. Accordingly, if the total number of external teeth 122 formed at the outer peripheral portion of the adapter 112 is an even number and the external tooth 122 is formed at the opposite side, across the axial center of the adapter 112, of any one of the external teeth 122, the distal ends 134A of the both pawls 130 both abut the external teeth 122.

However, in the present embodiment, as mentioned above, the total number of the external teeth 122 formed at the outer peripheral portion of the adapter 112 is an odd number. Thus, in the state in which the distal end 134A of the one pawl 130 is abutting the external tooth 122, the distal end 134A of the other pawl 130 has moved apart from the external tooth 122 along the peripheral direction of the adapter 112 (i.e., the distal end 134A of the other connecting piece 134 is not contacting the external tooth 122).

On the other hand, a releasing piece 136 extends from the outer peripheral portion of the main body 132. The releasing piece 136 is formed at the side of the main body 132 approximately opposite the side at which the connecting piece 134 is formed. The outer side surface of the releasing piece 136 is an inclined surface which is directed toward the outer side in the radial direction of the base plate 92 with respect to the pull-out direction. By rotating the releasing piece 136 in the pull-out direction, the connecting piece 134 rotates in the direction of moving away from the outer peripheral portion of the adapter 112.

Further, the clutch 90 is provided with a rotating disc 140 serving as a rotating member. The rotating disc 140 has a substantially plate-shaped base portion 142 whose direction of thickness runs along the axial directions of the base plate 92 and the adapter 112. A circular hole 144 is formed in the base portion 142. The inner diameter dimension of the circular hole 144 is formed to be extremely slightly larger than the outer diameter dimension of the tubular portion 114 formed coaxially with respect to the outer peripheral portion of the adapter 112 at the axial direction other end side of the adapter 112. By carrying out assembly by making the tubular portion 114 pass through the circular hole 144, the base portion 142, and thus, the rotating disc 140 are pivotally supported at the adapter 112 so as to freely rotate around the adapter 112.

Further, a pair of blocks 146 serving as a forcibly connecting mechanism are formed at the base portion 94 side surface of the base portion 142. The blocks 146 are formed so as to oppose one another across the circular hole 144. Among the two portions running along the outer periphery of the outer side of the circular hole 144 between the pair of blocks 146, one of the bosses 124 is positioned at one portion, and the other boss 124 is positioned at the other portion which is at the opposite side of this one portion across the circular hole 144.

A spring accommodating portion 148 is formed at the outer peripheral portion of one of the pair of blocks 146 (the outer peripheral surface of the block 146 which outer peripheral surface runs along the radial direction of the circular hole 144). A compression coil spring 150 serving as an urging member is accommodated in the spring accommodating portion 148.

The compression coil spring 150 is accommodated in the spring accommodating portion 148 in a state in which the compression coil spring 150 bends around the center of the circular hole 144. The take-up direction side end portion of the compression coil spring 150 abuts a wall portion 148A of the spring accommodating portion 148. The pull-out direction side end portion of the compression coil spring 150 abuts an abutment wall 152 which extends from the inner peripheral portion of the peripheral wall 96 of the base plate 92 and which enters into the spring accommodating portion 148.

The rotating disc 140 is pivotally supported at the tubular portion 114 of the adapter 112. Therefore, basically, the rotating disc 140 freely rotates relative to not only the adapter 112 but to the base plate 92 as well. However, as described above, the take-up direction side end portion of the compression coil spring 150 abuts the wall portion 148A of the spring accommodating portion 148, and the pull-out direction side end portion of the compression coil spring 150 abuts the abutment wall 152 of the base plate 92. Therefore, when the base plate 92 attempts to rotate in the take-up direction relative to the rotating disc 140, the abutment wall 152 pushes the rotating disc 140 in the take-up direction via the compression coil spring 150, and makes the rotating disc 140 rotate following the rotation of the base plate 92. Thus, provided that torque, which is of a magnitude which can resist the urging force of the compression coil spring 150, is not applied to the rotating disc 140, rotation of the base plate 92 in the take-up direction relative to the rotating disc 140 is limited.

Moreover, a pressing piece 154 is provided at the inner peripheral portion of each block 146. These pressing pieces 154 are disposed at the take-up direction sides of the pawls 130, and can move relative to the blocks 146 (i.e., relative to the rotating disc 140) along peripheral walls 156 formed at the blocks 146 so as to curve coaxially with respect to the circular hole 144. Further, compression coil springs 158 are provided at the sides of the pressing pieces 154 opposite the sides at which the pawls 130 are provided. The compression coil springs 158 are disposed in states of being curved along the peripheral walls 156. One end of the compression coil spring 158 is anchored at and connected to the end portion of the pushing piece 154 at the side opposite the side where the pawl 130 is provided. In contrast, the other end of the compression coil spring 158 is, in a state of abutting an abutment wall 160 which is formed at the rotating disc 140 at the side opposite the pushing piece 154, anchored at and connected to a projection (not illustrated) which is formed so as to project from the abutment wall 160 toward the pushing piece 154.

Inclined surfaces 164 are formed at the transverse direction outer ends of the connecting pieces 134 of the pawls 130, in correspondence with the respective pushing pieces 154. The inclined surface 164 is inclined outwardly in the radial direction of the base plate 92 with respect to the take-up direction. In the state in which the distal end 134A does not contact the outer peripheral portion of the adapter 112, the inclined surface 164 opposes (faces) the pushing piece 154 along the peripheral direction of the base plate 92 and the rotating disc 140. The pushing piece 154 is formed so as to abut the inclined surface 164 due to the base plate 92 rotating by a predetermined amount in the take-up direction relative to the rotating disc 140. When, from this state of abutment, the base plate 92 attempts to rotate even further in the take-up direction relative to the rotating disc 140, the inclined surface 164 is pushed in the pull-out direction by the pushing piece 154. Due to this pushing force, the pawl 130 rotates in the take-up direction around the boss 124.

At the take-up direction side end portion of each block 146 which runs along the peripheral direction of the rotating disc 140, a pushing portion 166 is formed, and a releasing piece accommodating portion 168 is formed further toward the axial center of the rotating disc 140 than the pushing portion 166. The pushing portion 166 is formed so as to correspond to the releasing piece 136 of the pawl 130 along the peripheral direction of the rotating disc 140. The releasing piece 136 gradually curves toward the axial center of the base plate 92 from the portion thereof connected to the main body 132 (the proximal end portion thereof) toward the distal end side thereof. The (transverse direction) outer side surface of the releasing piece 136 as well is curved in a similar way.

Accordingly, when the base plate 92 rotates by a predetermined amount in the pull-out direction relative to the rotating plate 140, the pushing portions 166 abut the (transverse direction) outer side surfaces of the releasing pieces 136. In this state of abutment, when the base plate 92 is rotated further in the pull-out direction relative to the rotating disc 140, the pushing portions 166 push the distal end portions of the releasing pieces 136 in the take-up direction. Here, the distal ends of the releasing pieces 136 are inclined surfaces which are inclined toward the outer side in the radial direction of the rotating disc 140, with respect to the pull-out direction. Thus, due to the pushing portions 166 pushing the distal ends of the releasing pieces 136, the pushing portions 166 rotate the pawls 130 in the pull-out direction around the bosses 124 and guide them to the releasing piece accommodating portions 168.

Moreover, the friction ring 170 is disposed coaxially between the cover 98 and the base portion 142 of the rotating disc 140. The friction ring 170 is formed in a ring shape on the whole. A pair of tongue-shaped attachment pieces 172 extend from the inner peripheral portion of the friction ring 170 so as to oppose one another across the center of the friction ring 170. The attachment pieces 172 are integrally connected to the base portion 142 of the rotating disc 140 by fasteners such as screws or the like. In this way, the rotating disc 140 and the friction ring 170 are integral. The outer peripheral portion of the friction ring 170 corresponds to the distal end of the aforementioned braking piece 80. Due to the frame 64 rotating in the pull-out direction around the shaft 70, the distal end of the braking piece 80 slidingly contacts the outer peripheral portion of the friction ring 170.

The external gear 102 of the clutch 90 having the above-described structure meshes together with the gear 62.

OPERATION AND EFFECTS OF PRESENT EMBODIMENT

Next, the operation and effects of the present embodiment will be described by way of explaining the operation of the present webbing retractor 10.

(Basic Operation of Webbing Retractor 10)

First, the basic operation of the webbing retractor 10 will be described.

In the present webbing retractor 10, in the state in which the webbing belt 28 is taken-up and accommodated in the form of a roll on the spool 20, when the webbing belt 28 is pulled while an unillustrated tongue plate is pulled, the webbing belt 28 is pulled out while the spool 20 is rotated in the pull-out direction against the urging force of the spiral spring 34 which urges the spool 20 in the take-up direction. In this way, in the state in which the webbing belt 28 is pulled out, the vehicle occupant seated in a seat inserts the tongue plate in an unillustrated buckle device while pulling the webbing belt 28 around the front of his/her body, such that the tongue plate is held in the buckle device. The webbing belt 28 is thereby set in a state of being applied to the body of the vehicle occupant (hereinafter, this state will be referred to simply as the "applied state").

When the webbing belt 28 is pulled out and the spool 20 is rotated in the pull-out direction in order to apply the webbing belt 28 to the body of a vehicle occupant, the spiral spring 34 is wound tighter, such that the urging force of the spiral spring 34 which urges the spool 20 in the take-up direction increases. Accordingly, in the aforementioned applied state, the urging force of the spiral spring 34 works to make the webbing belt 28 be taken up on the spool 20. Thus, basically, the webbing belt 28 is fit to the body of the vehicle occupant due to this urging force, and the webbing belt 28 restrains and holds the body of the vehicle occupant by a force corresponding to the urging force at this time.

On the other hand, when holding of the tongue plate by the buckle device is released and the tongue plate comes out of the buckle device, the force for maintaining the webbing belt 28 in the state of being pulled-out against the urging force of the spiral spring 34 is cancelled. Thus, the spool 20 is rotated in the take-up direction by the urging force of the spiral spring 34. The webbing belt 28 which has been pulled out is taken-up in the form of a roll onto the outer peripheral portion of the spool 20 due to the rotation of the spool 20 in the take-up direction. In this way, the webbing belt 28 is accommodated.

Here, because the spool 20 is fit together with the adapter 112 of the clutch 90, when the spool 20 is rotated in order to pull-out or take-up the webbing belt 28, the adapter 112 rotates. However, in this state, if the adapter 112 merely rotates, the base plate 92 and the rotating disc 140 do not rotate. Therefore, the pawls 130 do not rotate. Accordingly, the external gear 102 does not rotate. Accordingly, the rotation of the spool 20 is not transmitted to the output shaft 50 of the motor 44 via the external gear 102 and the gears 62, 56.

(Operation of Webbing Retractor 10 when Approaching an Obstacle Ahead)

On the other hand, while the vehicle is traveling, the forward observation sensor 54 detects the distance to an obstacle which is in front of the vehicle. An electric signal having a signal level corresponding to the distance to the obstacle is outputted from the forward observation sensor 54. The electric signal outputted from the forward observation sensor 54 is inputted to the ECU 52. At the ECU 52, on the basis of the electric signal from the forward observation sensor 54, it is judged whether or not the distance to the obstacle is less than a predetermined value.

Next, if it is judged at the ECU 52 that the distance to the obstacle is less than the predetermined value, the ECU 52 outputs a control signal to the driver 46, and makes current flow to the motor 44 via the driver 46. In this way, the motor 44 is driven to rotate forward at a speed of a predetermined value or more, and rotates the output shaft 50 forward.

The rotation of the output shaft 50 is, while being decelerated via the gears 56, 62, transmitted to the external gear 102 of the clutch 90, and rotates the external gear 102 in the take-up direction at a rotational speed of a predetermined value or more. The external gear 102 is mechanically connected to the base plate 92 via the torque limiters 104. Thus, due to the external gear 102 rotating in the take-up direction, the base plate 92 rotates integrally in the take-up direction.

When the base plate 92 rotates in the take-up direction, the abutment wall 152 pushes the take-up direction side end portion of the compression coil spring 150, and the compression coil spring 150 pushes the wall portion 148A of the spring accommodating portion 148 by urging force. The rotating disc 140 thereby attempts to rotate so as to follow rotation of the base plate 92.

On the other hand, as described above, when the rotation of the output shaft 50 is transmitted to the gear 62 via the gear 56, rotation is transmitted from the gear 62 to the gear 72, and the gear 72 attempts to rotate downward around the gear 62 while rotating around the shaft 74. However, the urging force of the tension coil spring 78 is applied to the frame 64 at which the shaft 74, which pivotally supports the gear 72, is supported. Thus, the gear 72 cannot rotate downward around the gear 62. However, as described above, the output shaft 50 rotates at a rotational speed of a predetermined value or more, and this rotation is transmitted to the gear 72. In this way, the resultant force of the force applied to the gear 72 around the gear 62 and the gravity based on the self-weight of the gear 72 and the weight of the weight 76, exceeds the urging force of the tension coil spring 78. The gear 72, and consequently, the frame 64, are rotated around the shaft 70.

In this way, the braking piece 80 slidingly contacts the outer peripheral portion of the friction ring 170. The friction, which is generated between the braking piece 80 and the outer peripheral portion of the friction ring 170, restricts rotation of the friction ring 170, and accordingly, of the rotating disc 140 which is integral with the friction ring 170. In this way, relative rotation arises between the base plate 92 and the rotating disc 140, and the base plate 92 can be rotated reliably in the take-up direction with respect to the rotating disc 140.

In this way, when the base plate 92 rotates by a predetermined amount or more in the take-up direction relative to the rotating disc 140, the pushing pieces 154 provided at the blocks 146 of the rotating disc 140 abut the connecting pieces 134 of the pawls 130. In this state, when the base plate 92 attempts to rotate further in the take-up direction relative to the rotating disc 140, the pushing pieces 154 push the inclined surfaces 164 of the connecting pieces 134 in the pull-out direction. The pushing forces applied to the inclined surfaces 164 act in the pull-out direction and toward the inner side in the radial direction of the rotating disc 140 and the base plate 92. The portions of the forces, which portions act toward the radial direction inner sides, rotate the pawls 130 in the take-up direction around the bosses 124. As shown in FIG. 6, due to the pawls 130 rotating in the take-up direction around the bosses 124, the corner portions of the distal ends 134A abut the outer peripheral portion of the adapter 112. In this state, the pawls 130 rotate together with the base plate 92 in the take-up direction around the center of the base plate 92, until the pawls 130 abut the external teeth 122 which are adjacent at the take-up direction sides.

Then, in this state, the distal ends 134A abut the external teeth 122. When the base plate 92 rotates further in the take-up direction, the distal ends 134A of the pawls 130 push the external teeth 122 in the take-up direction, and rotate the adapter 112, and accordingly, the spool 20, in the take-up direction. Due to this rotation of the spool 20, the webbing belt 28 is taken-up onto the spool 20. In this way, looseness or so-called "slack" in the webbing belt 28 is eliminated, and the force by which the webbing belt 28 restrains the body of the vehicle occupant is improved. Even if the vehicle occupant thereafter carries out the operation of suddenly braking the vehicle such that a state of rapid deceleration of the vehicle arises, the webbing belt 28 reliably holds the body of the vehicle occupant.

In this way, when the motor 44 stops in the state in which slack has been eliminated, rotation of the base plate 92 in the take-up direction stops. When rotation of the base plate 92 stops, the compression coil spring 150 pushes the rotating disc 140 in the take-up direction by urging force, and rotates the rotating disc 140 in the take-up direction. When the rotating disc 140 rotates, the pushing portions 166 abut the releasing pieces 136 of the pawls 130 and push the releasing pieces 136 in the take-up direction. Due to the releasing pieces 136 receiving this pushing force, the pawls 130 rotate in the pull-out direction around the bosses 124, and as shown in FIG. 5, the distal ends 134A of the connecting pieces 134 move away from the outer peripheral portion of the adapter 112. In this way, the mechanical connection between the base plate 92 and the adapter 112, i.e., the mechanical connection between the output shaft 50 of the motor 44 and the compression coil spring 150, is cancelled.

Here, in the present embodiment, as described above, the total number of the external teeth 122 of the adapter 112 is an odd number. In the state in which the distal end 134A of one of the pawls 130 is abutting the external tooth 122, the distal end 134A of the other pawl 130 is apart from the external tooth 122 along the peripheral direction of the adapter 112, and is positioned at an intermediate portion between the external tooth 122, which is adjacent in the take-up direction along the peripheral direction of the adapter 112, and the external tooth 122 which is adjacent in the pull-out direction.

Namely, in the present embodiment, in the state in which the distal ends 134A of the both pawls 130 abut the outer peripheral portion of the adapter 112, the interval from the distal end 134A of one of the pawls 130 to the distal end 134A of the other of the pawls 130 is not an integer multiple of the pitch of the external teeth 122. Thus, as shown in FIG. 7, even if the distal end 134A of one of the pawls 130 abuts the addendum of the external tooth 122 at the time when the both pawls 130 are rotating around the bosses 124, the distal end of the other of the pawls 130 does not abut the addendum of the external tooth 122, and abuts the outer peripheral portion of the adapter 112 between the external teeth 122 which are adjacent in the peripheral direction.

Accordingly, even if the distal end 134A of one of the pawls 130 abuts the addendum of the external tooth 122 and cannot mesh with the external tooth 122, the distal end 134A of the other of the pawls 130 reliably meshes with the external tooth 122 if the base plate 92 rotates by substantially one-half of the pitch of the external teeth 122. Thus, the rotation of the base plate 92 can reliably and swiftly be transmitted to the adapter 112, and the torque of the motor 44 can be transmitted to the spool 20.

Moreover, in the state in which the distal end 134A of one of the pawls 130 abuts the addendum of the external tooth 122, the connecting piece 134 abuts the pushing piece 154 in this state as is. Here, even if the pushing piece 154 is integral with the rotating disc 140, further rotation of the base plate 92 in the take-up direction relative to the rotating disc 140 is restricted. In this state, because the interference of the pushing piece 154 with the distal end of the other of the pawls 130 is insufficient, the pushing piece 154 cannot rotate the other pawl 130 sufficiently in the take-up direction. As a result, there is the possibility that the distal end of the other of the pawls 130 cannot abut the external tooth 122.

Here, in the present embodiment, as described above, the connecting piece 134 abuts the pushing piece 154 with the distal end 134A of the one pawl 130 abutting the addendum of the external tooth 122. In this state, when the base plate 92 attempts to rotate further in the take-up direction relative to the rotating disc 140, as shown in FIG. 7, the distal end 134A of the pawl 130 pushes the pushing piece 154 and displaces the pushing piece 154 in the take-up direction, against the urging force of the compression coil spring 158. In this way, the base plate 92 rotates in the take-up direction relative to the rotating disc 140.

Thus, the pushing piece 154 corresponding to the other pawl 130 interferes with the distal end 134A of the other pawl 130, and rotates the pawl 130 in the take-up direction.

In this way, even if the connecting piece 134 abuts the pushing piece 154 in a state in which the distal end 134A of the one pawl 130 abuts the addendum of the external tooth 122, the other pawl 130 can be made to mesh with the external tooth 122 of the adapter 112, and the rotation of the base plate 92 can be reliably transmitted to the adapter 112.

On the other hand, as described above, by rotating the spool 20 in the take-up direction by the torque of the motor 44, the force by which the webbing belt 28 restrains the body of the vehicle occupant is improved. However, until the slack is eliminated, in the state in which the webbing belt 28 is wound on the spool 20, the body of the vehicle occupant is an obstruction, and basically, the webbing belt 28 cannot be taken-up any further on the spool 20. In this state, if the spool 20 attempts to rotate further in the take-up direction and take-up the webbing belt 28, the webbing belt 28 is tightened against the body of the vehicle occupant by a force which is greater than needed, which is not preferable.

Here, as described above, if the spool 20 attempts to take-up the webbing belt 28 any more than needed, the body of the vehicle occupant is an obstruction to the taking-up of the webbing belt 28. Tensile force of a magnitude corresponding to the take-up force for the spool 20 to take the webbing belt 28 up is applied to the webbing belt 28 from the body of the vehicle occupant. This tensile force acts opposite to the direction in which the spool 20 takes up the webbing belt 28. Thus, the spool 20 is stopped due to this tensile force being applied to the webbing belt 28.

In this state, the torque of the motor 44 is applied to the spool 20 via the external gear 102, the base plate 92, the pawls 130 and the adapter 112. Thus, in the state in which the spool 20 is stopped, the external teeth 122 of the adapter 112 restrict rotation of the pawls 130 around the center of the base plate 92, and the pawls 130 restrict rotation of the base plate 92 in the take-up direction. Moreover, via the torque limiters 104, the base plate 92 restricts rotation of the external gear 102 in the take-up direction.

Here, in this state in which the rotation of the external gear 102 is limited by the base plate 92 via the torque limiters 104, if the external gear 102 attempts to rotate further in the take-up direction and the torque at this time exceeds the spring force of the torque limiters 104, the engaging portions 106 of the torque limiters 104 come out from the engaging recesses 100. In this way, the connection between the base plate 92 and the external gear 102 is temporarily cancelled, and only the external gear 102 rotates in the take-up direction until the engaging portions 106 enter into the other, adjacent engaging recesses 100. In this way, due to the connection between the base plate 92 and the external gear 102 being cancelled, the transmission of the torque of the external gear 102 to the base plate 92, i.e., the transmission of the torque of the motor 44 to the spool 20, is cut-off. Thus, an increase in the restraining force applied by the webbing belt 28 can be suppressed.

As described above, the clutch 90 used in the present webbing retractor 10 not only has the function of transmitting torque, but also can cut-off the transmission of torque by the torque limiters 104 when an excessive torque is applied. Regardless of the fact that the above-described effects can be obtained, the widthwise dimension of the torque limiters 104 (the dimension thereof along the axial direction of the external gear 102) is less than the axial direction dimension of the external gear 102. The rotating disc 140 and the torque limiters 104 are therefore all disposed between the peripheral wall 96 of the base plate 92 and the external gear 102 along the radial direction of the external gear 102.

Moreover, members such as the pawl 130, the rotating disc 140 and the like as well are disposed between the peripheral wall 96 and the adapter 112. These members are accommodated at the inner side of the external gear 102. Thus, the thickness dimension (the axial direction dimension) of the clutch 90 is, in actuality, the axial direction dimension of the external gear 102, and is extremely thin.

In this way, because the clutch 90 having the torque limiters 104 can be made thin, the present webbing retractor 10 can be made compact.

STRUCTURE OF SECOND EMBODIMENT

Next, another embodiment of the present invention will be described. Note that, in describing the respective embodiments hereinafter, regions which are basically the same as those of the previous embodiments (including the above-described first embodiment) are denoted by the same reference numerals, and detailed description thereof is omitted.

Figure 8:
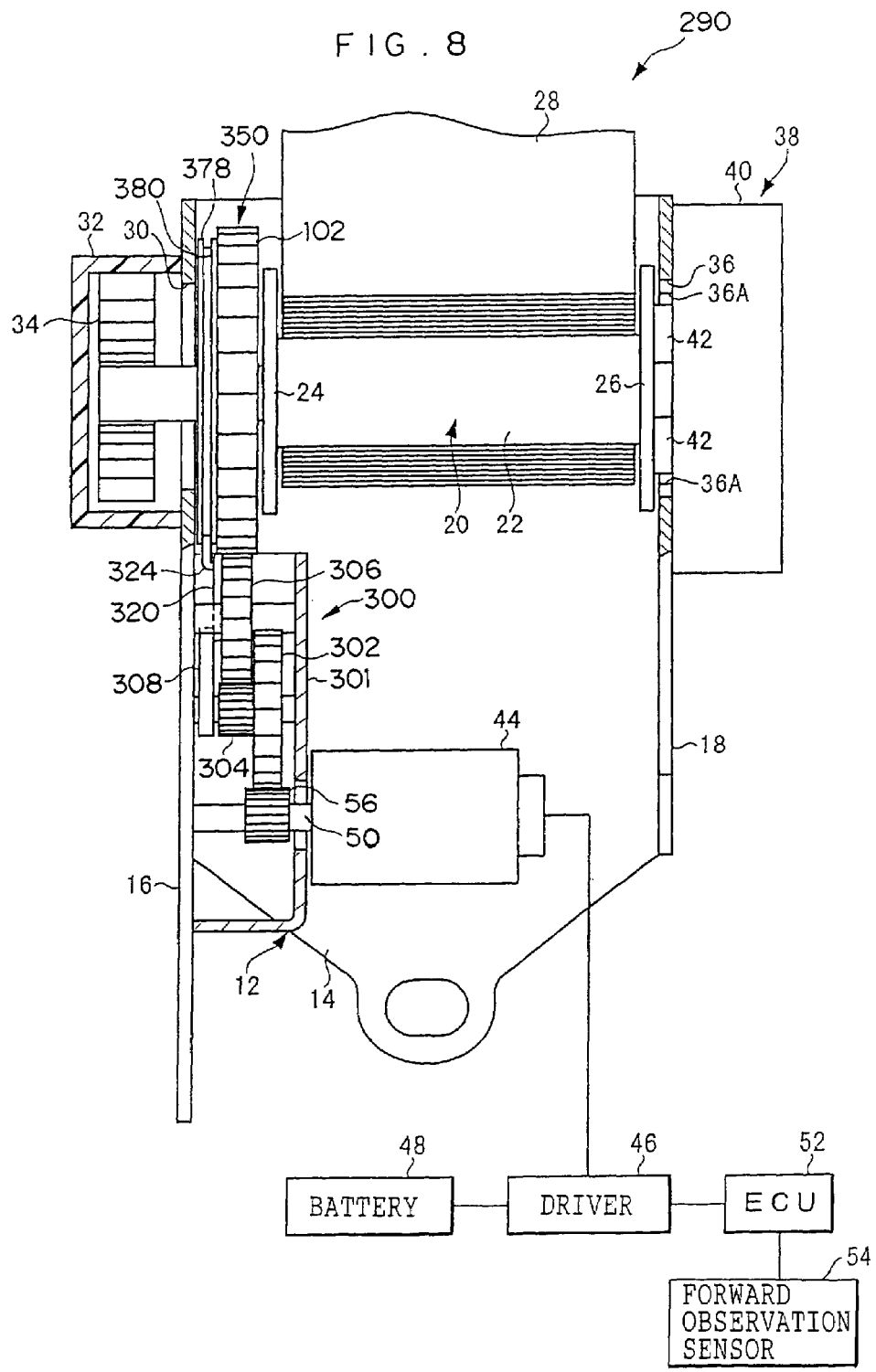
FIG. 8 is a front view showing the basics of the structure of a webbing retractor relating to a second embodiment of the present invention.

The structure of a webbing retractor 290 relating to a second embodiment of the present invention is shown in schematic front view in FIG. 8.

As shown in FIG. 8, the webbing retractor 290 relating to the present embodiment differs from the webbing retractor 10 relating to the above-described first embodiment in that the webbing retractor 290 does not have the braking mechanism 60 and the clutch 90, and instead, is equipped with a braking mechanism 300 and a clutch 350 which serves as the clutch mechanism.

(Structure of Braking Mechanism 300)

Figure 9:
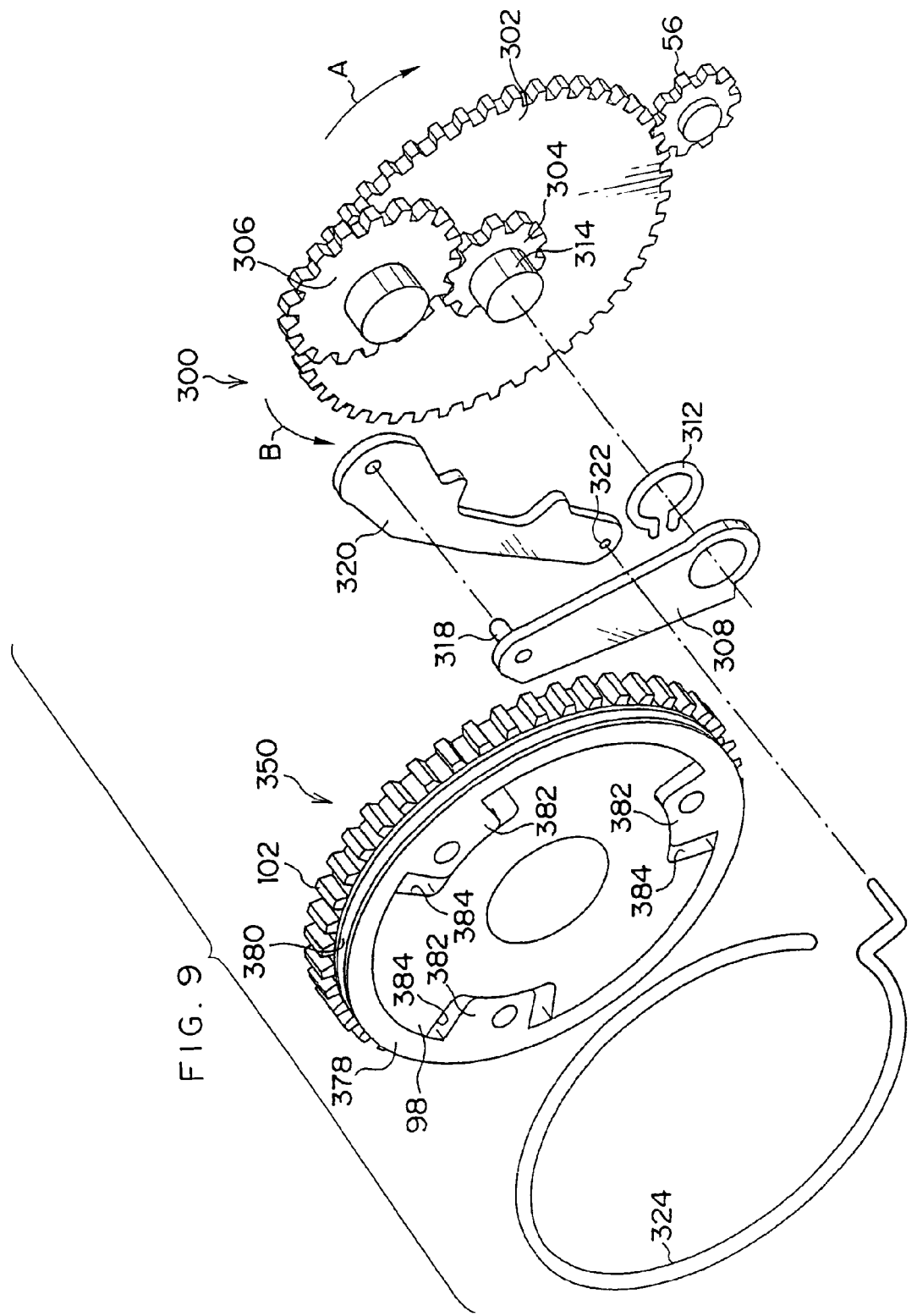
FIG. 9 is an exploded perspective view of a clutch mechanism of the webbing retractor relating to the second embodiment of the present invention.

As shown in FIGS. 8 and 9, a gear 56, which is provided coaxially and integrally at the distal end portion of the output shaft 50 of the motor 44, meshes with an external gear 302 structuring the braking mechanism 300. The number of teeth of the gear 302 is sufficiently larger than that of the gear 56. The axial direction ends of the gear 302 are pivotally supported at the leg plate 16 of the frame 12 and a frame 301 of the braking mechanism 300.

At the leg plate 16 side of the gear 302, a gear 304, which has a number of teeth which is sufficiently smaller than that of the gear 302, is provided coaxially and integrally with respect to the gear 302. Above the gear 304, a gear 306, which has more teeth than the gear 304, is pivotally supported at the leg plate 16 and the frame 301 in a state in which the gear 306 meshes with the gear 304. Moreover, above the gear 306, the external gear 102, which serves as a prime mover rotating body forming the clutch 350 which will be described later, meshes with the gear 306. The rotation of the output shaft 50 is decelerated and transmitted to the external gear 102 via the gears 56, 302, 304, 306.

Figure 10:
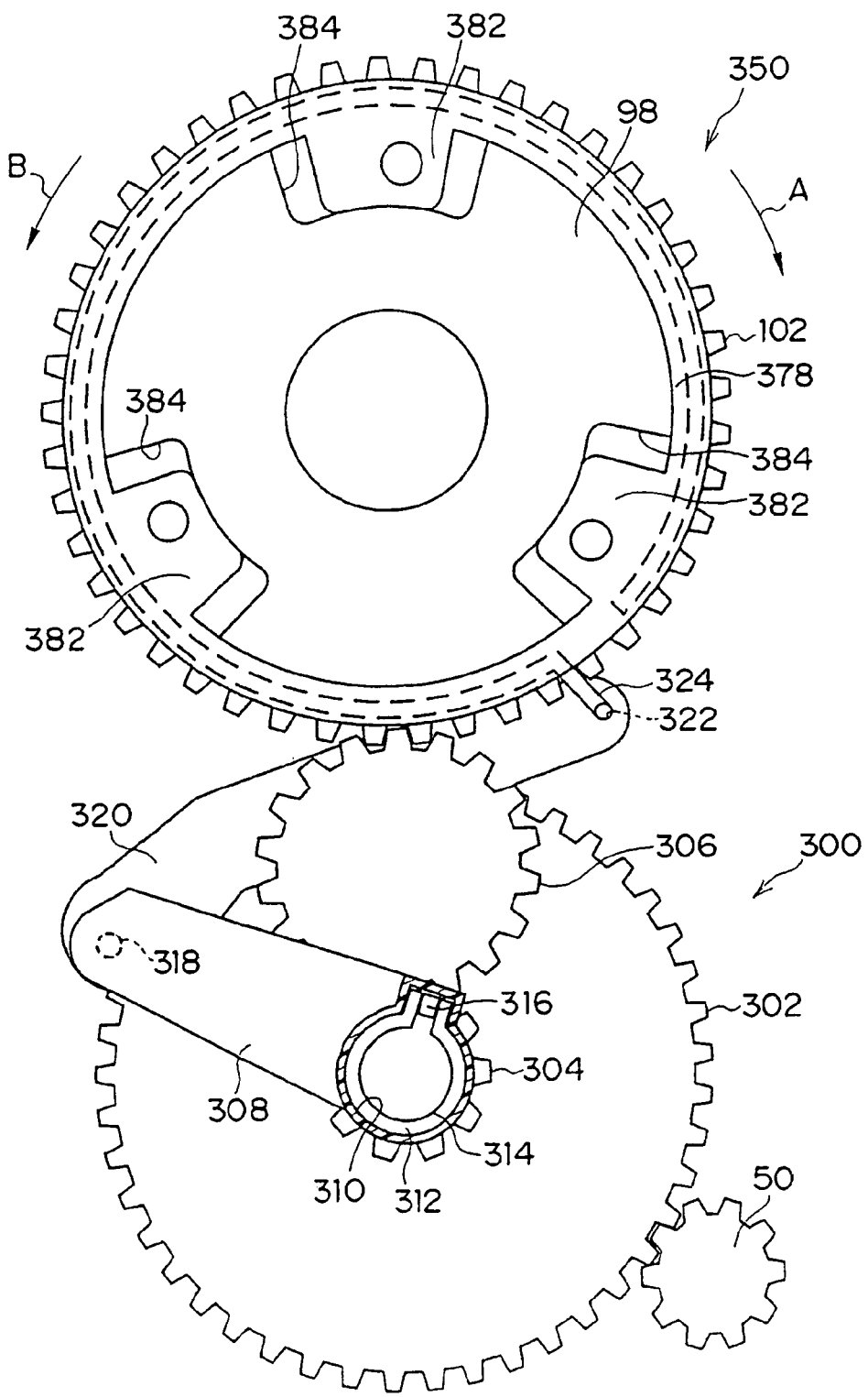
FIG. 10 is a side view showing the basics of a braking mechanism of the webbing retractor relating to the second embodiment of the present invention.

On the other hand, an arm 308 is provided at the leg plate 16 side of the gear 304. The arm 308 is a plate-shaped member whose longitudinal direction runs along the rotation radial direction of the gear 302 and whose direction of thickness runs along the axial direction of the gear 302. A substantially circular spring accommodating portion 310 is formed at the proximal end side, in the longitudinal direction, of the arm 308 (see FIG. 10).

A friction spring 312 is accommodated in the spring accommodating portion 310. The friction spring 312 is formed on the whole in a substantial ring shape. The inner peripheral portion of the friction spring 312 slidingly contacts a shaft portion 314 which is integral with the gear 304. Further, the both peripheral direction ends of the friction spring 312 bend outwardly in the radial direction.

A wall portion 316 is formed in the spring accommodating portion 310 in correspondence with the region between the bent both ends of the friction spring 312. When the friction spring 312 attempts to rotate around the shaft portion 314 with respect to the arm 308, one of the both ends of the friction spring 312 interferes with the wall portion 316, such that the friction spring 312 pushes the wall portion 316 in the direction of rotation thereof.

On the other hand, a shaft portion 318 is formed to project from the distal end side of the arm 308 toward the gear 302. The proximal end portion of a lever 320 is pivotally supported at the shaft portion 318 so as to be freely rotatable around the shaft portion 318. The lever 320 is a plate-shaped member whose longitudinal direction runs along the radial direction of the shaft portion 318, and whose direction of thickness is along the axial direction of the gear 302. A through hole 322, which passes through in the direction of thickness, is formed at the longitudinal direction distal end side of the lever 320. The pull-out direction side end portion of a brake spring 324, which is formed in a substantial ring shape, is fit into the through hole 322.

(Structure of Clutch 350)

Figure 11:
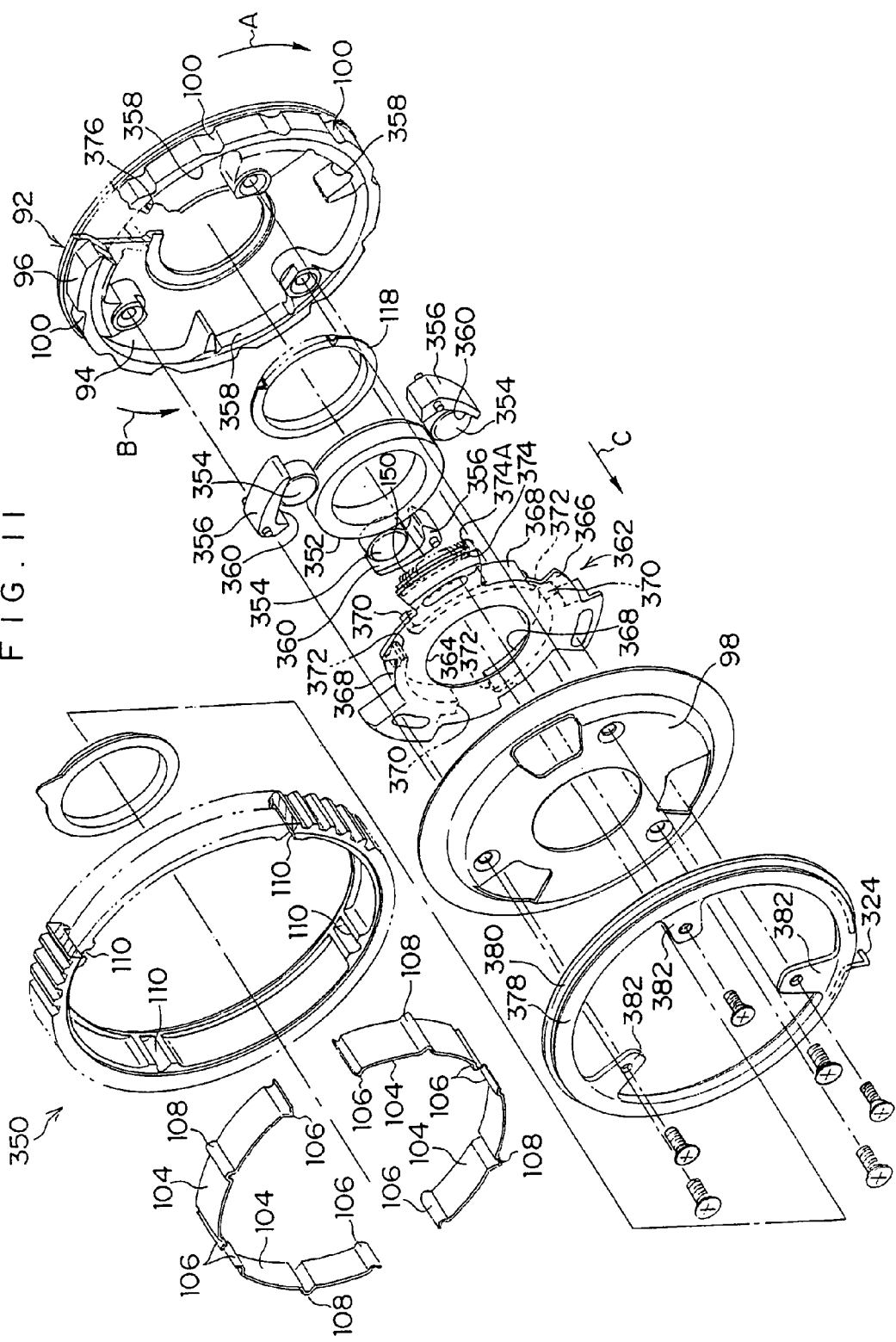
FIG. 11 is an exploded perspective view of the clutch mechanism of the webbing retractor relating to the second embodiment of the present invention.

On the other hand, as shown in FIG. 11, the clutch 350, which has the external gear 102 which structures the clutch 350, is equipped with the base plate 92. The base plate 92 is formed in the shape of a hollow cylinder which has a bottom and whose axial direction dimension is extremely short (or in the shape of a shallow tray). The substantially ring-shaped peripheral wall 96 is formed along the outer peripheral portion of the disc-shaped base portion 94 of the base plate 92. The cover 98, which is shaped as a thin disc, is attached to the open end at one axial direction end side of the base plate 92 (the arrow C direction side in FIG. 11), such that the open end of the base plate 92 is basically closed.

The engaging recesses 100 are formed at uniform intervals along the peripheral direction in the outer peripheral portion of the peripheral wall 96. The external gear 102, which is substantially ring-shaped and which has a number of teeth which is sufficiently larger than that of the gear 302, is disposed coaxially with the base plate 92 at the outer side of the peripheral wall 96. The inner diameter dimension of the external gear 102 is sufficiently larger than the outer diameter dimension of the peripheral wall 96. An annular gap is formed between the inner peripheral portion of the external gear 102 and the outer peripheral portion of the peripheral wall 96. The plurality of torque limiters 104 are disposed intermittently in the peripheral direction in this annular gap.

The torque limiters 104 are plate-shaped metal pieces having thin widths and having a spring property. The engaging portions 106, which can enter into the aforementioned engaging recesses 100, are formed at the both longitudinal direction end portions of each of the torque limiters 104. Further, the engaging projection 108, which is bent as if to project out in a direction substantially opposite to the projecting direction of the engaging portions 106, is formed substantially at the longitudinal direction center of each of the torque limiters 104.

The engaging recesses 110 are formed at the inner peripheral portion of the external gear 102 in correspondence with the engaging projections 108. Due to the engaging portions 106 entering into the engaging recesses 100 in the state in which the engaging projections 108 are in the engaging recesses 110, the base plate 92 and the external gear 102 are connected substantially integrally via the torque limiters 104.

In this way, when the external gear 102 attempts to rotate relative to the base plate 92 around the axis of the base plate 92, the torque limiters 104 also of course attempt to rotate integrally together with the external gear 102. However, due to the engaging portions 106 of the torque limiters 104 being in the engaging recesses 100, when the engaging portions 106 attempt to rotate along the peripheral direction of the peripheral wall 96, the engaging recesses 100 interfere with (engage) the engaging portions 106 such that rotation of the engaging portions 106 is restricted.

In this way, relative rotation of the external gear 102 with respect to the base plate 92 is restricted, and basically, the external gear 102 and the base plate 92 are connected integrally.

However, as described above, because the torque limiters 104 are metal pieces having a spring property, if the torque generated by the relative rotation of the external gear 102 with respect to the base plate 92 is large enough to pull the engaging portions 106 out from the engaging recesses 100 against the spring force (urging force) of the torque limiters 104, the interference (engagement) of the engaging recesses 100 with the engaging portions 106 is released, and relative rotation of the external gear 102 with respect to the base plate 92 becomes possible.

On the other hand, an adapter 352, which is substantially hollow cylindrical and serves as a driven shaft and an inner side rotating body, is disposed substantially coaxially with respect to the base plate 92 at the inner side of the base plate 92. The adapter 352 is formed, on the whole, in the shape of a thick ring whose direction of thickness (axial direction) runs along the axial direction of the base plate 92. The above-described spool 20 is fit integrally and coaxially into the adapter 352. The spacer 118, which is formed in a ring shape and of a synthetic resin material, is fit into the base portion 94 side end portion of the adapter 352. One axial direction end surface of the spacer 118 (the side in the direction opposite to the direction of arrow C in FIG. 11) abuts the base portion 94.

A plurality (three in the present embodiment) of connecting rollers 354, each of which serves as a connecting member, are disposed at the radial direction outer side of the adapter 352. The connecting roller 354 is formed, on the whole, substantially in the shape of a solid cylinder. The axial direction of the connecting roller 354 is the axial direction of the adapter 352, i.e., substantially the same direction as the axial direction of the spool 20. Moreover, a lock piece 356 serving as a guiding member is provided between the connecting roller 354 and the peripheral wall 96 of the base plate 92.

The lock pieces 356 are formed of a material which has relatively high strength (e.g., a material which has mechanical strength which is sufficiently higher than that of the material forming the base plate 92). The lock pieces 356 are fixed integrally with the peripheral wall 96 in a state in which the lock pieces 356 are fit in piece mounting portions 358 which are formed at the inner peripheral portion of the peripheral wall 96.

A guide surface 360 is formed at the surface of the lock piece 356 at the side thereof which faces the connecting roller 354 along the radial direction of the adapter 352 and the base plate 92. The guide surface 360 is formed as an inclined surface or a curved surface whose distance from the outer peripheral surface of the adapter 352 gradually becomes shorter along the pull-out direction around the axial center of the adapter 352. Due to the connecting rollers 354 rotating or moving in the pull-out direction so as to follow along the guide surfaces 360, the connecting rollers 354 are forcibly made to approach the outer peripheral surface of the adapter 352.

Moreover, in a vicinity of the pull-out direction side end portion of the guide surface 360, the interval (distance) from the outer peripheral surface of the adapter 352 is set to be the same as or extremely slightly shorter than the outer diameter dimension of the connecting roller 354. Thus, when the connecting roller 354 moves to a vicinity of the pull-out direction side end portion of the guide surface 360, the connecting roller 354 contacts the outer peripheral portion of the adapter 352.

Moreover, a rotating disc 362 serving as a forcibly connecting member is provided at the side of the connecting rollers 354 opposite the side at which the base portion 94 of the base plate 92 is provided. The rotating plate 362 has a plate-shaped base portion 366 in which is formed a circular hole 364 through which the spool 20 passes. Basically, the rotating plate 362 rotates freely around the axial center of the spool 20 relative to the spool 20 and the base plate 92.

Figure 12:
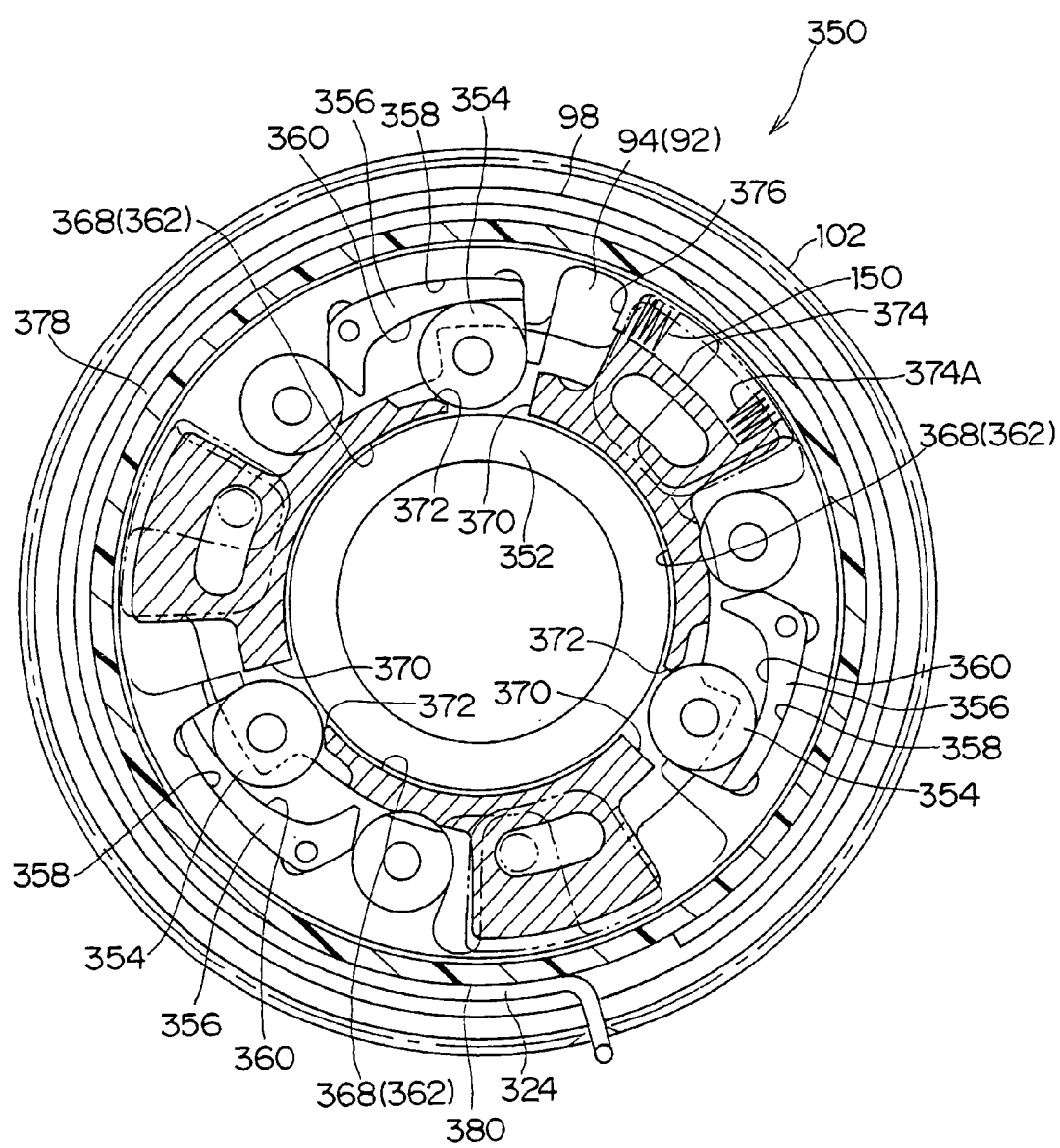
FIG. 12 is a side view showing the structure of the clutch mechanism.

A plurality of peripheral walls 368 are formed at the periphery of the circular hole 364 of the base portion 366. The peripheral walls 368 are formed at uniform intervals on an imaginary circumference which is concentric with the circular hole 364. The number of the peripheral walls 368 which are formed is the same as the number of the connecting rollers 354. The connecting rollers 354 are disposed between the peripheral walls 368. A restricting wall 370, which serves as a forcibly connecting mechanism, is formed at the pull-out direction side end portion (the end portion in the direction of arrow B in FIGS. 11 and 12) of the peripheral wall 368 around the axial center of the adapter 352. When the connecting roller 354 attempts to move by a predetermined amount or more in the take-up direction around the axial center of the adapter 352, the restricting wall 370 interferes with the outer peripheral portion of the connecting roller 354 so as to limit movement of the connecting roller 354.

In contrast, a wedge-shaped portion 372 serving as a forcibly releasing mechanism is formed at the take-up direction side end portion (the end portion in the direction of arrow A in FIGS. 11 and 12) of the peripheral wall 368 around the axial center of the adapter 352. The wedge-shaped portion 372 is formed in a taper shape whose thickness gradually decreases in the take-up direction. Due to the rotating plate 362 rotating in the take-up direction with respect to the connecting rollers 354, the wedge-shaped portions 372 interfere with the outer peripheral portions of the connecting rollers 354 in a vicinity of the outer peripheral portion of the adapter 352, and push the connecting rollers 354 in a direction of moving away from the outer peripheral portion of the adapter 352.

A spring attaching portion 374 is formed at one of the plurality of the peripheral walls 368. The compression coil spring 150 serving as an urging member is attached to the spring attaching portion 374. The compression coil spring 150 is curved such that the axial direction thereof approximately runs along the inner peripheral configuration of the peripheral wall 96. The take-up direction side end portion of the compression coil spring 150 abuts a wall portion 374A of the spring attaching portion 374, whereas the pull-out direction side end portion of the compression coil spring 150 abuts an abutment wall 376 formed at the inner peripheral portion of the peripheral wall 96.

In this way, the rotating disc 362 basically is freely rotatable around the axial center of the adapter 352 relative to the adapter 352 and the base plate 92. However, when the base plate 92 attempts to rotate in the take-up direction relative to the rotating disc 362, the abutment wall 376 presses the other end portion of the compression coil spring 150 in the take-up direction. In this way, the increased urging force of the compression coil spring 150 pushes the wall portion 374A in the take-up direction, and rotates the rotating disc 362 in the take-up direction.

Accordingly, when the base plate 92 attempts to rotate in the take-up direction relative to the rotating disc 362, the rotating disc 362 attempts to follow the rotation of the base plate 92 due to the urging force of the compression coil spring 150.

On the other hand, at the side of the cover 98 opposite the side at which the rotating disc 362 is disposed (i.e., at the outer side of the cover 98), a friction ring 378 serving as a friction member is disposed coaxially with respect to the adapter 352. The friction ring 378 is formed in a substantial ring shape on the whole. An annular accommodating groove 380, which accommodates the aforementioned brake spring 324, is formed in the outer peripheral portion of the friction ring 378. The outer diameter dimension of the accommodating groove 380 at the floor portion of the accommodating groove 380 is substantially equal to the inner diameter dimension of the brake spring 324. The inner peripheral portion of the brake spring 324 slidingly contacts the floor portion of the accommodating groove 380.

A plurality (three in the present embodiment) of tongue-shaped attachment pieces 382 extend from the inner peripheral portion of the friction ring 378. The attachment pieces 382 are integrally connected to the base portion 366 of the rotating disc 362 by fasteners such as screws or the like which pass through openings 384 formed in the cover 98. In this way, the rotating disc 362 and the friction ring 378 are integral.

The external gear 102 of the clutch 350 having the above-described structure meshes with the gear 306.

OPERATION AND EFFECTS OF SECOND EMBODIMENT

Next, the operation and effects of the present embodiment will be described by way of explaining the operation of the present webbing retractor 290.

(Operation of Webbing Retractor 290 when Approaching an Obstacle Ahead)

In the present embodiment, when the vehicle is traveling, the forward observation sensor 54 detects the distance to an obstacle ahead of the vehicle. An electric signal, which has a signal level corresponding to the distance to the obstacle, is outputted from the forward observation sensor 54.

The electric signal outputted from the forward observation sensor 54 is inputted to the ECU 52. At the ECU 52, on the basis of the electric signal from the forward observation sensor 54, it is judged whether or not the distance to the obstacle is less than a predetermined value.

Next, when it is judged at the ECU 52 that the distance to the obstacle is less than a predetermined value, the ECU 52 outputs a control signal to the driver 46, and makes current flow to the motor 44 via the driver 46. In this way, the motor 44 is driven to rotate forward at a speed which is greater than or equal to a predetermined value, and the output shaft 50 is rotated forward. The rotation of the output shaft 50 is transmitted to the external gear 102 of the clutch 350 while being decelerated via the gears 56, 302, 304, 306, and rotates the external gear 102 in the take-up direction at a rotational speed of a predetermined value or more.

The external gear 102 is mechanically connected to the base plate 92 via the torque limiters 104. Thus, due to the external gear 102 rotating in the take-up direction, the base plate 92 rotates integrally in the take-up direction.

When the base plate 92 rotates in the take-up direction, the abutment wall 376 presses the pull-out direction side end portion of the compression coil spring 150, and further, the compression coil spring 150 presses the wall portion 148A of the spring accommodating portion 148 by urging force. The rotating disc 362 thereby attempts to rotate so as to follow the base plate 92.

On the other hand, as described above, when the rotation of the output shaft 50 is transmitted to the gear 302 via the gear 56 and the gear 302 rotates, the shaft portion 314 rotates. Due to the shaft portion 314 rotating, the frictional force generated between the shaft portion 314 and the inner peripheral portion of the friction spring 312 attempts to rotate the friction spring 312. Due to the transmitted torque, the friction spring 312 pushes the wall portion 316, and rotates the arm 308 around the shaft portion 314 (see FIG. 10).

Due to the arm 308 rotating, the proximal end portion of the lever 320 rotates around the shaft portion 314. In this way, the lever 320 rotates one end of the brake spring 324 (the end portion at the side engaged with the distal end of the lever 320) in the pull-out direction (the direction of arrow B in FIGS. 10, 11 and 12).

As described above, the inner peripheral portion of the brake spring 324 slidingly contacts the floor portion of the accommodating groove 380 of the friction ring 378. Thus, due to the brake spring 324 rotating, frictional force is generated between the brake spring 324 and the floor portion of the accommodating groove 380.

This frictional force works to restrict rotation of the brake spring 324. Thus, the other end side of the brake spring 324 does not follow the rotation of the one end side. In this way, the brake spring 324 tightens against the floor portion of the accommodating groove 380. The brake spring 324 attempts to rotate the friction ring 378, and consequently, the rotating disc 362 which is integral with the friction ring 378, in the pull-out direction. The base plate 92 rotates in the take-up direction relative to the rotating disc 362 due to this rotation of the rotating disc 362 itself in the pull-out direction and due to the torque received at the external gear 102.

In this way, when the base plate 92 rotates in the take-up direction relative to the rotating disc 362, the guide surfaces 360 of the lock pieces 356 fixed to the base portion 94 of the base plate 92 push the connecting rollers 354 and rotate the connecting rollers 354 in the take-up direction around the axial center of the adapter 352. When the connecting rollers 354 rotate by a predetermined amount, the restricting walls 370 interfere with the outer peripheral portions of the connecting rollers 354, such that the rotation of the connecting rollers 354 is restricted.

Figure 13:
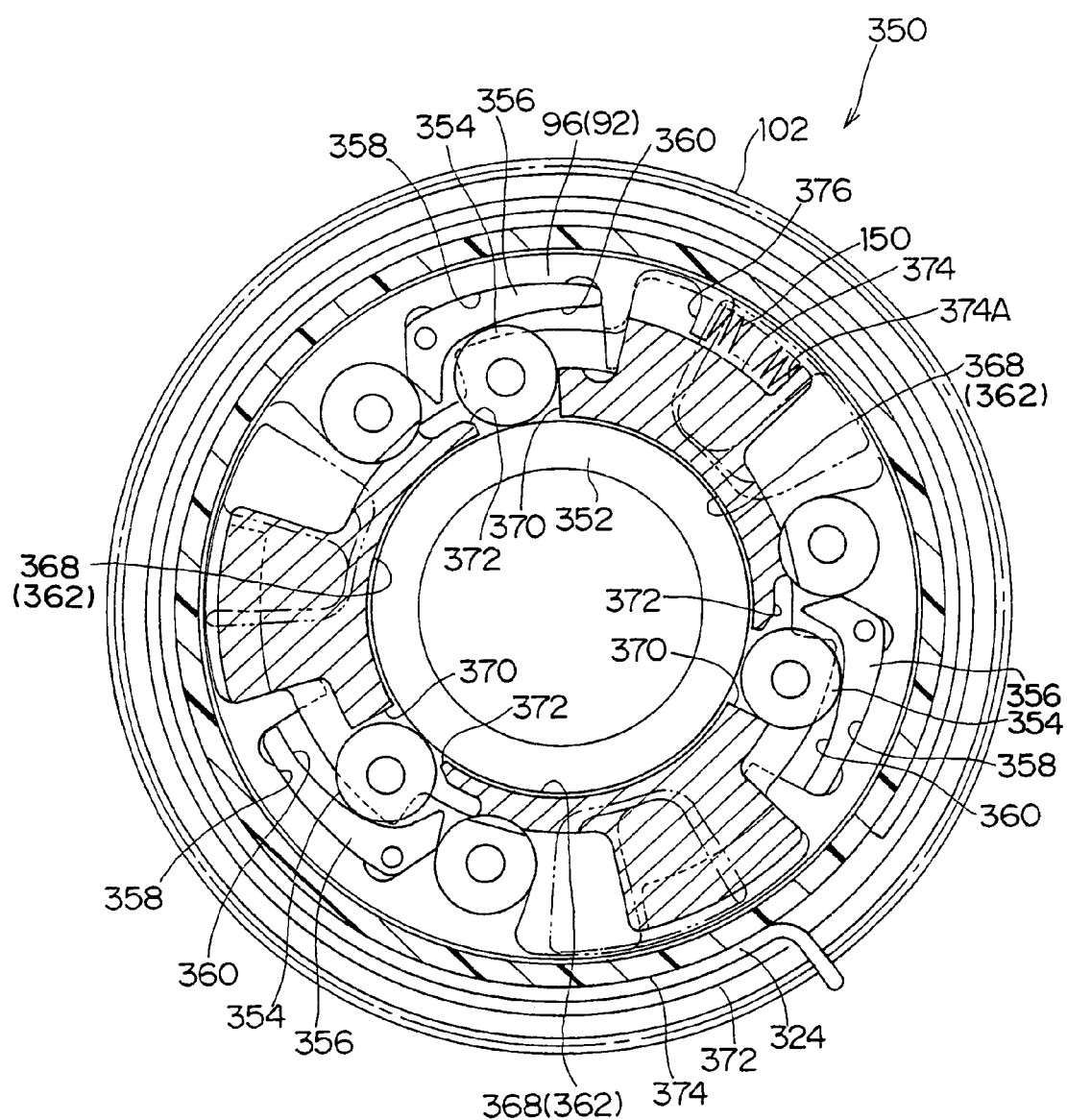
FIG. 13 is a side view of the clutch mechanism of FIG. 12, and shows a state in which a connecting mechanism engages a driven shaft.

Due to the guide surfaces 360 further pushing the connecting rollers 354 in this state, the connecting rollers 354 are moved so as to approach the outer peripheral portion of the adapter 352. Due to the guide surfaces 360 pushing the connecting rollers 354 until the connecting rollers 354 contact the outer peripheral portion of the adapter 352, the connecting rollers 354 are sandwiched between the outer peripheral portion of the adapter 352 and the guide surfaces 360. The connecting rollers 354 press-contact both the outer peripheral portion of the adapter 352 and the guide surfaces 360 (see FIG. 13).

In this way, the rotation of the base plate 92 is transmitted to the adapter 352 via the lock pieces 356 and the connecting rollers 354. The adapter 352, and accordingly, the spool 20 which is integral with the adapter 352, are rotated in the take-up direction.

The webbing belt 28 is taken-up onto the spool 20 due to the rotation of the spool 20. In this way, looseness or so-called "slack" in the webbing belt 28 is eliminated, and the force by which the webbing belt 28 restrains the body of the vehicle occupant is improved. Even if the vehicle occupant thereafter carries out the operation of suddenly braking the vehicle such that a state of rapid deceleration of the vehicle arises, the webbing belt 28 reliably holds the body of the vehicle occupant.

In this way, when the motor 44 stops in the state in which slack has been eliminated, rotation of the base plate 92 in the take-up direction stops. When rotation of the base plate 92 stops, the compression coil spring 150 pushes the rotating disc 362 in the take-up direction by urging force, and rotates the rotating disc 362 in the take-up direction.

When the rotating disc 362 rotates, the wedge-shaped portions 372 push the outer peripheral portions of the connecting rollers 354, and move the connecting rollers 354 away from the outer peripheral portion of the adapter 352. In this way, the mechanical connection between the base plate 92 and the adapter 352, i.e., the mechanical connection between the output shaft 50 of the motor 44 and the compression coil spring 150, is cancelled (see FIG. 12).

In this way, in the present embodiment, the wedge-shaped portions 372 forcibly move the connecting rollers 354 away from the outer peripheral portion of the adapter 352. Thus, the state of press-contact between the connecting rollers 354 and the outer peripheral portion of the adapter 352 is not unnecessarily maintained due to frictional force or the like which arises between the connecting rollers 354 and the outer peripheral portion of the adapter 352.

As described above, the connecting rollers 354 move by being pressed by the guide surfaces 360 of the lock pieces 356, and press-contact the outer peripheral portion of the adapter 352. However, when the connecting rollers 354 press-contact the outer peripheral portion of the adapter 352 due to sudden rotation of the base plate 92, a great load is applied to the lock pieces 356 as well.

Here, in the present embodiment, the lock pieces 356 are basically structured as members which are separate from the base plate 92. Thus, it is possible to improve the mechanical strength of only the lock pieces 356. Therefore, even if the weight increases by forming the lock pieces 356 of a material having strength which can sufficiently withstand the aforementioned load, the increase in weight is limited to the lock pieces 356 alone.

Moreover, by improving the mechanical strength of the lock pieces 356, the mechanical strength of the base plate 92 overall is not increased more than needed. Thus, a relatively light-weight material can be used for the entire base plate 92, except for the lock pieces 356. Thus, the entire clutch 350 can be made to be lighter weight.

Moreover, as described above, the connecting rollers 354 move by being pressed by the guide surfaces 360. Thus, the period of time from the start of rotation of the base plate 92 to the time when the connecting rollers 354 press-contact the outer peripheral surface of the adapter 352, differs slightly in accordance with the angle of inclination or the radius of curvature of the guide surfaces 360.

Here, in the present embodiment, as described above, the lock pieces 356 are formed as separate members independent of the base plate 92. Thus, plural types of lock pieces 356, at which the angles of inclination or the radii of curvature of the guide surfaces 360 are different, are prepared and the type to be used is appropriately selected in accordance with the specifications or the requirements of the vehicle or the like. In this way, the setting of the period of time until the connecting rollers 354 press-contact the outer peripheral surface of the adapter 352 can be changed easily without changing the parts other than the lock pieces 356, such as the base plate 92 or the like.

On the other hand, in the present embodiment, as described above, the rotation of the rotating disc 362 following the rotation of the base plate 92 is forcibly restricted by the braking mechanism 300, and further, the rotating disc 362 is forcibly relatively rotated in the pull-out direction. In this way, relative rotation in the take-up direction of the base plate 92 with respect to the rotating disc 362 can be generated quickly and reliably. Thus, the mechanical connection between the base plate 92 and the adapter 352 due to the above-described movement of the connecting rollers 354 can be carried out quickly and reliably.

As described above, by rotating the spool 20 in the take-up direction by the torque of the motor 44, the force by which the webbing belt 28 restrains the body of the vehicle occupant is improved. However, until the slack is eliminated, in the state in which the webbing belt 28 is wound on the spool 20, the body of the vehicle occupant is an obstruction, and basically, the webbing belt 28 cannot be taken-up any further onto the spool 20.

In this state, if the spool 20 attempts to rotate further in the take-up direction and take-up the webbing belt 28, the webbing belt 28 tightens against the body of the vehicle occupant by a force which is greater than needed, which is not preferable.

Here, as described above, if the spool 20 attempts to take-up the webbing belt 28 any more than needed, the body of the vehicle occupant is an obstacle to the taking-up of the webbing belt 28. Tensile force of a magnitude corresponding to the take-up force for the spool 20 to take the webbing belt 28 up is applied to the webbing belt 28 from the body of the vehicle occupant. This tensile force acts opposite to the direction in which the spool 20 takes up the webbing belt 28. Thus, the spool 20 is stopped due to this tensile force being applied to the webbing belt 28.

In this state, the torque of the motor 44 is applied to the spool 20 via the external gear 102, the base plate 92, the connecting rollers 354 and the adapter 352. Thus, in the state in which the spool 20 is stopped, the connecting rollers 354, which are nipped between the adapter 352 and the guide surfaces 360, restrict rotation of the base plate 92 in the take-up direction via the lock pieces 356. Moreover, via the torque limiters 104, the base plate 92 restricts rotation of the external gear 102 in the take-up direction.

Here, in this state in which the rotation of the external gear 102 is limited by the base plate 92 via the torque limiters 104, if the external gear 102 attempts to rotate further in the take-up direction and the torque at this time exceeds the spring force of the torque limiters 104, the engaging portions 106 of the torque limiters 104 come out from the engaging recesses 100. In this way, the connection between the base plate 92 and the external gear 102 is temporarily cancelled, and only the external gear 102 rotates in the take-up direction until the engaging portions 106 enter into the other, adjacent engaging recesses 100.

In this way, due to the connection between the base plate 92 and the external gear 102 being cancelled, the transmission of the torque of the external gear 102 to the base plate 92, i.e., the transmission of the torque of the motor 44 to the spool 20, is cut-off. Thus, an increase in the restraining force applied by the webbing belt 28 can be suppressed.

Moreover, at the clutch 350, the torque limiters 104 are disposed between the external gear 102 and the peripheral wall 96, and the connecting rollers 354 and the rotating disc 362 are disposed between the peripheral wall 96 and the adapter 352. Thus, the entire thickness dimension of the clutch 350 can be made to be about the axial direction dimension of the external gear 102. In this way, the clutch 350 can be made thin, and the webbing retractor 290 can be made compact.

In the present embodiment, the ECU 52 drives the motor 44 via the driver 46 on the basis of the signal from the forward observation sensor 54 when the distance to an obstacle ahead is less than or equal to a given value. However, a structure is possible in which the motor 44 is driven in a case in which, for example, a state of rapid deceleration of the vehicle is detected by an acceleration sensor.

STRUCTURE OF THIRD EMBODIMENT

Next, a third embodiment of the present invention will be described.

Figure 14:
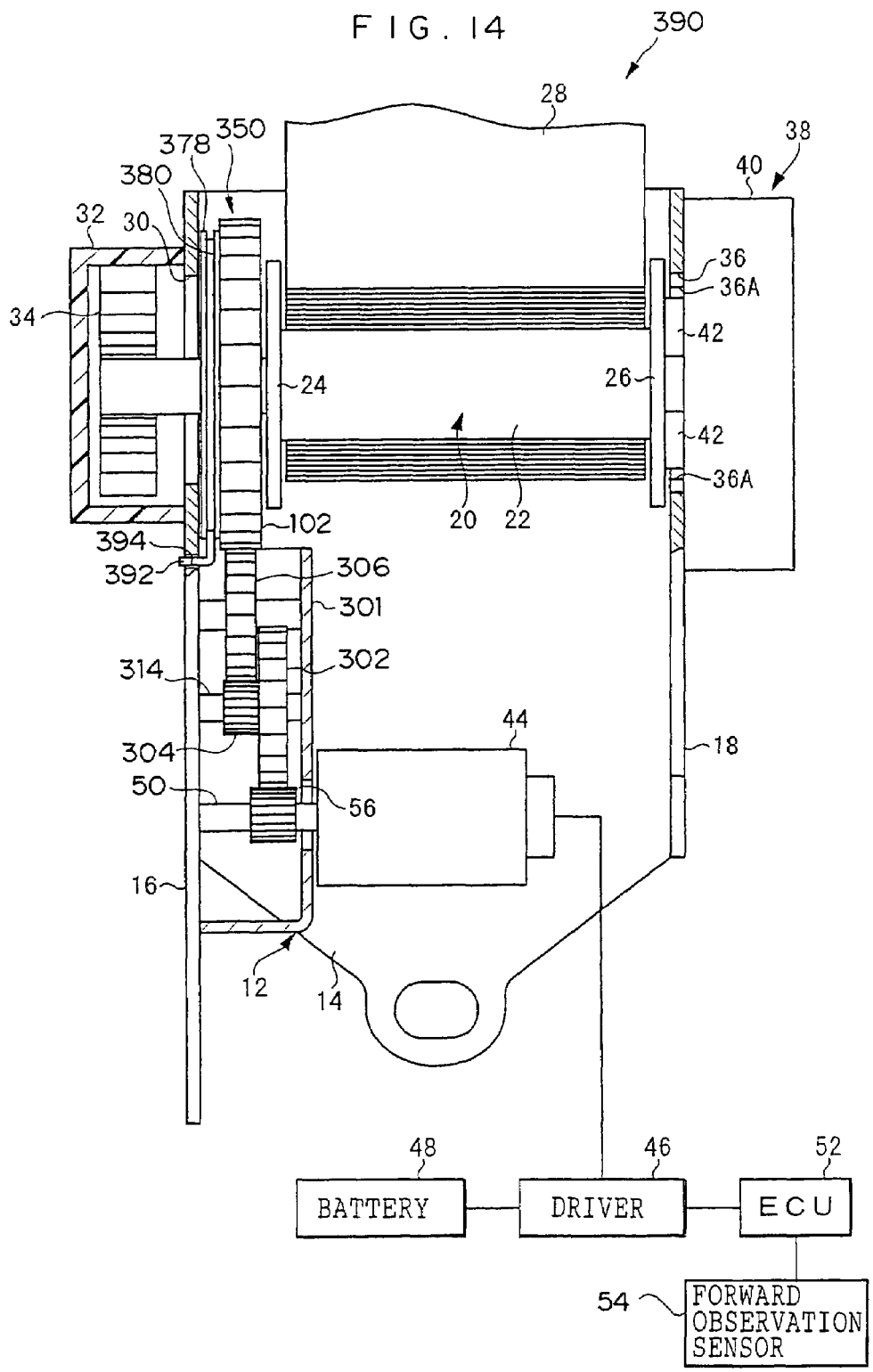
FIG. 14 is a front view showing the basics of the structure of a webbing retractor relating to a third embodiment of the present invention.

The basics of the structure of a webbing retractor 390 relating to the present embodiment are shown in front view in FIG. 14. The basics of the structure of the webbing retractor 390 are shown in exploded perspective view in FIG. 15. As shown in these figures, in the same way as the webbing retractor 290 relating to the above-described second embodiment, the webbing retractor 390 has the gears 302, 304, 306.

However, the present webbing retractor 390 does not have the arm 308 and the lever 320. Accordingly, in the present embodiment, the gears 302, 304, 306 do not structure the braking mechanism, and are merely a reduction gear train for decelerating the rotation of the output shaft 50 of the motor 44 and transmitting it to the external gear 102.

In this way, the present webbing retractor 390 differs from the webbing retractor 290 relating to the second embodiment in that the webbing retractor 390 does not have the braking mechanism 300. However, the present webbing retractor 390 does have the clutch mechanism 350. Further, the webbing retractor 390 also has the friction ring 378. As shown in FIGS. 14 and 15, a brake spring 392, which forms the braking mechanism in the present embodiment, is accommodated in the accommodating groove 380 of the friction spring 378 instead of the brake spring 324. The brake spring 392 is basically the same as the brake spring 324. However, the pull-out direction side end portion of the brake spring 392 is directed in the direction opposite that of the brake spring 324, and enters into a hole portion 394 formed in the leg plate 16.

Namely, in the present embodiment, when the rotation of the output shaft 50 of the motor 44 is transmitted to the external gear 102 via the gears 56, 302, 304, 306 and the external gear 102 rotates in the take-up direction, the abutment wall 376 attempts to rotate the compression coil spring 150 in the take-up direction. Moreover, the compression coil spring 150 presses the wall portion 374A of the spring attaching portion 374, and attempts to rotate the rotating disc 362 in the take-up direction. In this way, the friction ring 378, which is integral with the rotating disc 362, attempts to rotate in the take-up direction while following the brake spring 392 due to the frictional resistance.

However, the pull-out direction side end portion of the brake spring 392 is in the hole portion 394 formed in the leg plate 16. Thus, rotation of the brake spring 392 itself is restricted. In this state, the brake spring 392 attempts, by friction, to restrict rotation of the friction ring 378 against the urging force of the compression coil spring 150. Thus, relative rotation arises between the rotating disc 362 and the external gear 102.

Due to relative rotation arising between the rotating disc 362 and the external gear 102 in this way, as explained in the second embodiment as well, the connecting rollers 354 are moved so as to approach the outer peripheral portion of the adapter 352, and are nipped between the outer peripheral portion of the adapter 352 and the guide surfaces 360. The connecting rollers 354 press-contact both the outer peripheral portion of the adapter 352 and the guide surfaces 360 (see FIG. 13).

In this way, the rotation of the base plate 92 is transmitted to the adapter 352 via the lock pieces 356 and the connecting rollers 354. The adapter 352, and accordingly, the spool 20 which is integral with the adapter 352, are rotated in the take-up direction.

Due to this rotation of the spool 20, the webbing belt 28 is taken-up onto the spool 20. In this way, looseness or so-called "slack" in the webbing belt 28 is eliminated, and the force by which the webbing belt 28 restrains the body of the vehicle occupant is improved. Even if the vehicle occupant thereafter carries out the operation of suddenly braking the vehicle such that a state of rapid deceleration of the vehicle arises, the webbing belt 28 reliably holds the body of the vehicle occupant.

In this way, in the present embodiment, the pull-out direction side end portion of the brake spring 392 is merely disposed in the hole portion 394 which is formed in the leg plate 16. However, the brake spring 392, by frictional resistance, restricts rotation of the friction ring 378 which is integral with the rotating disc 362. Thus, effects which are similar to those of the braking mechanism 60 of the previously-described first embodiment and the braking mechanism 300 of the previously-described second embodiment can be obtained.

Moreover, in the present embodiment, in order to structure the braking mechanism, members other than the brake spring 392, e.g., the arm 308, the lever 320, and the like, are not needed. Therefore, the webbing retractor 390 can be realized at a low cost, and can be made more compact and lighter weight.

As described above, in accordance with the present invention, at the time of driving of a driving mechanism, a braking mechanism forcibly restricts rotation of a rotating member which follows a prime mover rotating body, and relative rotation is forcibly generated between the prime mover rotating body and the rotating member. Thus, the prime mover rotating body and a driven shaft are reliably connected by connecting members which are interlocked with this relative rotation. The driving force of the driving mechanism can be reliably transmitted to a take-up shaft and can reliably rotate the take-up shaft.

What is claimed is:

1. A webbing retractor for an elongated, strip-shaped webbing belt used for application to a body of a vehicle occupant, the webbing retractor comprising:
    a take-up shaft for taking the webbing belt up around itself, which take-up shaft is rotatably held, and to which one end of the webbing belt is anchored;
    a driven shaft connected to the take-up shaft;
    a prime mover rotating body rotatably supported relative to and coaxially with the driven shaft;
    a rotating member supported coaxially with both the prime mover rotating body and the driven shaft, and rotatable relative to both the prime mover rotating body and the driven shaft;
    connecting members for connecting the prime mover rotating body and the driven shaft, by interlocking with relative rotation of the rotating member with respect to the prime mover rotating body, so as to transmit rotation of the prime mover rotating body to the driven shaft;
    a driving mechanism, including a drive source, for driving rotation of the prime mover rotating body in a predetermined direction; and
    a braking mechanism for braking rotation of the rotating member such that relative rotation of the rotating member with respect to the prime mover rotating body arises,
    wherein the rotating member has a friction member which is attached to the rotating member and rotates integrally with the rotating member, and the braking mechanism has a braking member which slidingly contacts the friction member, and the braking mechanism brakes due to the braking member slidingly contacting the friction member; and
    further comprising a frame which is fixed, wherein the friction member is substantially ring shaped, and the braking member is substantially shaped as a ring having one end and another end, and the braking member is disposed so as to surround one portion of an outer peripheral surface of the friction member, and in a state in which the one end of the braking member is held at the outer peripheral surface of the friction member, the other end of the braking member is anchored at the frame so as to be pulled in a direction of decreasing a diameter of the braking member when the friction member is rotated.

2. The webbing retractor of claim 1, wherein the driven shaft is rotatably connected integrally with the take-up shaft.

3. The webbing retractor of claim 1, further comprising an urging member, attached to the prime mover rotating body, for urging the rotating member in a direction of rotation of the prime mover rotating body when the prime mover rotating body is rotated, wherein the urging member has one end and another end and is elastically deformable, and the one end is attached to the prime mover rotating body, and the other end is held at the rotating member so as to be able to push the rotating member.

4. The webbing retractor of claim 1, further comprising an urging member, attached to the prime mover rotating body, for urging the rotating member in a direction of rotation of the prime mover rotating body when the prime mover rotating body is rotated, wherein the urging member has a coil spring.

5. The webbing retractor of claim 1, wherein the driven shaft has a peripheral surface, and the connecting members are held at the prime mover rotating body so as to be able to approach and move away from the driven shaft, and when the prime mover rotating body is rotated, the connecting members contact the peripheral surface of the driven shaft due to the relative rotation, and connect the prime mover rotating body and the driven shaft.

6. The webbing retractor of claim 5, wherein a plurality of teeth are formed at the peripheral surface of the driven shaft, and the connecting members have pawl shapes which can engage with any of the teeth, and at least one of the connecting members contacts the tooth of the driven shaft so as to engage with the tooth, and connects the prime mover rotating body and the driven shaft.

7. The webbing retractor of claim 5, wherein the connecting members are roller-shaped, and due to the relative rotation, the connecting members are pressed by the peripheral surface of the driven shaft and connect the prime mover rotating body and the driven shaft, and rotation of the prime mover rotating body is thereby transmitted to the driven shaft.

8. The webbing retractor of claim 1, wherein, due to the braking mechanism applying frictional force to the rotating member, rotation of the rotating member is braked.

9. The webbing retractor of claim 1, wherein the braking mechanism brakes the rotating member when the prime mover rotating body is driven to rotate at greater than a predetermined speed.

10. The webbing retractor of claim 1, wherein the braking mechanism connects the driving mechanism such that motion of the braking mechanism for braking can be transmitted from the driving mechanism.

11. The webbing retractor of claim 1, wherein the braking mechanism brakes the rotating member interlockingly with driving rotation of the prime mover rotating body by the driving mechanism.

12. The webbing retractor of claim 1, wherein the prime mover rotating body has an external gear which is ring shaped and has external teeth for connection to the driving mechanism such that the external gear can be driven and rotated; a base portion having a holding portion for holding the plurality of connecting members, the base portion being pivotally supported coaxially with the rotating member; and at least one torque limiter provided between the external gear and the base portion, so as to be able to transmit torque in a predetermined range to the base portion from the external gear.

13. The webbing retractor of claim 1, further comprising a control unit for controlling operation of the driving mechanism, wherein the control unit effects control so as to cause the driving mechanism to operate when a rate of change in deceleration at a time when the vehicle decelerates is greater than or equal to a predetermined value.

14. The webbing retractor of claim 1, further comprising a control unit for controlling operation of the driving mechanism, wherein the control unit effects control so as to cause the driving mechanism to operate when a distance to an obstacle which is positioned ahead of the vehicle is less than a predetermined value.

15. A webbing retractor for a webbing belt, the webbing retractor having a take-up shaft, and by rotating the take-up shaft in one direction, the webbing retractor takes-up and accommodates, on the take-up shaft and from a proximal end side, a webbing belt which is elongated and strip-shaped and which is applied to a body of a vehicle occupant so as to restrain the body and which has a distal end and a proximal end, and due to the webbing belt being pulled toward a distal end side, the webbing retractor rotates the take-up shaft in another direction, and the webbing belt, which is taken-up on the take-up shaft, is pulled out, the webbing retractor comprising:
  a driven shaft connected to the take-up shaft coaxially and integrally;
  a prime mover rotating body which is substantially ring shaped and which is provided coaxially with the driven shaft so as to be able to rotate relative to the driven shaft;
  a rotating member which is able to rotate relative to and coaxially with both the prime mover rotating body and the driven shaft;
  connecting members which, interlockingly with relative rotation of the rotating member with respect to the prime mover rotating body, mechanically connect the prime mover rotating body and the driven shaft, and transmit rotation of the prime mover rotating body to the driven shaft;
  a driving mechanism having an output shaft which is connected one of directly and indirectly to the prime mover rotating body, and the driving mechanism rotates the output shaft by driving force of the driving mechanism;
  a braking mechanism which, interlockingly with rotation of the output shaft, applies frictional force to the rotating member and impedes rotation of the rotating member, and
  a rotation transmitting mechanism which is provided between the output shaft and the prime mover rotating body, and which receives rotation from the output shaft and rotates, and which transmits rotation of the rotation transmitting mechanism to the prime mover rotating body;
  wherein the braking mechanism includes a friction member which is substantially ring shaped and which is exposed to an exterior of the prime mover rotating body in a state in which the friction member is mechanically connected to the rotating member; and a braking member which is attached to one of the output shaft and the rotation transmitting mechanism, and which, interlockingly with rotation of the one of the output shaft and the rotation transmitting mechanism, moves so as to approach the friction member and slidingly contacts the friction member.

* * * * *